(12) United States Patent
Bond et al.

(10) Patent No.: US 12,025,516 B2
(45) Date of Patent: Jul. 2, 2024

(54) STRAIN SENSORS WITH ENHANCED TEMPERATURE COMPENSATION

(71) Applicant: SenSanna Incorporated, Hanover, MD (US)

(72) Inventors: Justin Bond, Baltimore, MD (US); Dana Y. G. Tucker, Belmont, NH (US); Jacqueline H. Hines, Annapolis, MD (US)

(73) Assignee: SenSanna Incorporated, Hanover, MD (US)

( * ) Notice: Subject to any disclaimer, the term of this patent is extended or adjusted under 35 U.S.C. 154(b) by 336 days.

(21) Appl. No.: 17/761,416

(22) PCT Filed: Sep. 22, 2020

(86) PCT No.: PCT/US2020/052048
§ 371 (c)(1),
(2) Date: Mar. 17, 2022

(87) PCT Pub. No.: WO2021/061672
PCT Pub. Date: Apr. 1, 2021

(65) Prior Publication Data
US 2022/0412822 A1 Dec. 29, 2022

Related U.S. Application Data

(60) Provisional application No. 62/904,320, filed on Sep. 23, 2019.

(51) Int. Cl.
*G01L 1/26* (2006.01)
*G01L 1/16* (2006.01)

(52) U.S. Cl.
CPC .............. *G01L 1/26* (2013.01); *G01L 1/165* (2013.01)

(58) Field of Classification Search
CPC .................... G01L 1/26; G01L 1/165
See application file for complete search history.

(56) References Cited

U.S. PATENT DOCUMENTS 6,339,365 B1 * 1/2002 Kawase .............. H03H 9/1071
333/133
6,378,370 B1 4/2002 Haskell et al.
6,668,105 B2 * 12/2003 Chen ....................... G01L 1/242
385/12

(Continued)

OTHER PUBLICATIONS

International Search Report and Written Opinion mailed Feb. 4, 2021 in PCT/US2020/052048, 9 pages.

*Primary Examiner* — Freddie Kirkland, III
(74) *Attorney, Agent, or Firm* — Rothwell, Figg, Ernst & Manbeck, P.C.

(57) ABSTRACT

The present disclosure provides a new and improved temperature compensated surface-launched acoustic wave (SAW) strain sensor using multiple reflectors in SAW devices mounted on a split-carrier package that provides complete isolation from strain for a temperature sensing portion of the device, while exposing a strain sensing portion of the device to both strain and temperature, with the influence of temperature being common to the various portions of the device, and a single acoustic reference with respect to which multiple differential acoustic measurements can be made, to provide inherently temperature-compensated strain measurements.

15 Claims, 16 Drawing Sheets

(56) References Cited

U.S. PATENT DOCUMENTS

| | | |
|---|---|---|
| 8,258,674 B2 | 9/2012 | Olariu |
| 9,477,857 B2 | 10/2016 | Youngquist et al. |
| 9,702,772 B2 * | 7/2017 | Haines .................... G01L 1/165 |
| 11,588,465 B2 * | 2/2023 | Fukuhara .............. H03H 9/6406 |
| 2002/0028034 A1 | 3/2002 | Chen et al. |
| 2007/0064765 A1 * | 3/2007 | Solie .................... G01K 11/265 |
| | | 374/E1.004 |
| 2023/0146607 A1 * | 5/2023 | Tan .................... H03H 9/02834 |
| | | 310/313 R |

\* cited by examiner

| # of Sensors | 2 Chip Length (mm) | 4 Peak Precision ($\mu e$) | 3 Peak Precision ($\mu e$) |
|---|---|---|---|
| 3 | 23.17 | 0.25 | 0.02 |
| 3 | 19.71 | 0.3 | 0.025 |
| 2 | 12.37 | 0.5 | 0.075 |
| 3 | 17.33 | 0.1 | 0.02 |
| 2 | 11.10 | 0.2 | 0.03 |
| 1 | 5.88 | 0.5 | 0.1 |

FIG. 11

STRAIN SENSORS WITH ENHANCED TEMPERATURE COMPENSATION

CROSS-REFERENCE TO RELATED APPLICATIONS

This application is a 35 U.S.C. 371 National Phase Entry Application from PCT/US2020/052048, filed Sep. 22, 2020, which filing claims priority to under 35 U.S.C. § 119 to U.S. Provisional Application No. 62/904,320, entitled "Strain Sensors with Enhanced Temperature Compensation," filed on Sep. 23, 2019, the contents of both of which are hereby incorporated by reference in their entireties.

FIELD

The present disclosure relates to temperature compensated acoustic wave sensor apparatuses, including surface-launched acoustic wave (SAW) sensor apparatuses.

BACKGROUND

It has been recognized since the 1970's that acoustic wave devices, which are generally built on piezoelectric substrates, are sensitive to mechanical stresses and thus can be used to measure strain. U.S. Pat. No. 3,888,115 to Schwartz (hereinafter "Schwartz"), which discloses an early acoustic wave strain sensor, teaches a split substrate acoustic wave sensor with two surface acoustic wave devices—one for measuring strain and the other to provide a "built in reference providing independence from temperature and positional effects". Schwartz discloses first and second surface wave delay line oscillators, which are "fabricated side by side on a crystalline quartz substrate". [Schwartz, column 1, line 39-42]. The crystalline quartz substrate is "provided with a sawcut through the substrate between the two oscillators;" thus forming two legs. [Schwartz, col. 1, lines 45-48]. Schwartz further explains that one leg is left free of mechanical coupling to serve as a reference by which changes due to temperature or position can be developed and used to cancel similar effects that are induced in the stressed leg. The acoustic delay lines are used in transmission (S21 mode) as frequency control elements in the oscillators. The two oscillators are designed to operate at different frequencies, with the acoustic delay lines each designed to yield a total zero degree loop phase at their respective operating frequency. For the two acoustic delay lines to operate at different frequencies, they likely have different acoustic delays to achieve zero degree loop phase. Signals from the two oscillators go into a mixer, producing a difference frequency between them that depends on strain (nominal difference at a given temperature+change due to strain). As temperature changes, the delay of each of the acoustic delay line elements will change, which will result in a change in the operating frequency of each oscillator. The change in delay of each acoustic delay line with temperature is proportional to the designed device delay at a reference temperature, so if the design delays of the two acoustic delay line elements are not identical, the change in frequency in the two oscillators with a change in temperature will be different. Thus, the system must be characterized to determine the nominal change in the difference frequency with temperature over the entire operating temperature range, so that the impact of temperature on performance can be subtracted from the change due to strain and temperature, to produce a calculated, largely temperature compensated strain measurement. Variations in the performance of the electronic components used to create an output frequency with changes in temperature may also introduce errors in the temperature compensation process.

This early, wired strain sensor, as disclosed by Schwartz, while providing some degree of temperature compensation by having both the strain and temperature sensing elements on the same substrate, presents unsurpassable difficulties in manufacturing and use. First, each sensor die must be manipulated to produce a "sawcut through the substrate between the two oscillators" to provide portions that will be mechanically separate enough to provide strain isolation for the reference die. This process requires each individual die to be handled and cut, which is a labor intensive and time-consuming process that does not lend itself to mass production. Second, the 'leg', or portion of the SAW substrate to be used for strain measurement, has to be firmly adhered to the object in which strain is to be measured, while the reference leg of the substrate must be kept unadhered for mechanical isolation. Achieving the required adhesion for one side of the die while maintaining the other side free of any adhesive requires extremely precise adhesive application and clamping processes. While this can be accomplished in a controlled laboratory environment, this die mounting process, which must be performed in a very clean environment and without damaging the fragile SAW die, is difficult, if not impossible, to perform for the various arbitrary components to be monitored by the SAW die. Further, for device operation, the SAW devices must be electrically connected to external electrical circuits to read the oscillator frequencies. Schwartz indicates that certain electronic components (matching networks, amplifier, and possibly mixer) may be mounted as a separate assembly on the common connected end of the SAW substrate, and the SAW can be wire bonded to these components. Performing this wire bonding operation after mounting of the SAW substrate on a test article poses multiple obstacles, including, for example, (1) bringing the test article to the elevated temperature needed for thermosonic bonding, (2) mounting the test article in a wire bonding apparatus, which has very limited space, (3) maintaining cleanliness of the SAW die during this operation, and (4) performing package sealing operations to protect the die with the test article attached (which may be large or incompatible with environmental parameters used during sealing). These obstructions render the sensor of Schwartz impractical for conventional applications.

Since Schwartz, numerous other implementations of SAW strain sensors have been investigated, for both wired and wireless operation. All of these devices use one of two SAW device embodiments—either (1) resonators or (2) delay lines—as the strain sensitive elements. Several publications discuss both resonator and delay line use. A wide range of measurement systems have been developed for these and other SAW sensors, and, in general, the measurand of interest for strain measurement has been frequency of an oscillator (controlled by a resonator or delay line) or delay (or equivalently phase), or a differential measurement of two frequencies or two delays. Differential measurements are used to eliminate variations in device response due to radio frequency ("RF") delay between the reader and sensor (a positional variable, whether wired or wireless). Inclusion of coding in certain delay line devices has been reported. Delay lines have been used in transmission (S21) mode, as in Schwartz, and in reflection (S21) mode, with one or more reflectors. Delay line sensor die that have the input/output ("I/O") transducer located near one end, with other transducer and/or reflector elements located to one side (which we refer to as 'single-ended' die) have been reported, as have 'two-sided' die where the I/O transducer is located relatively centrally on the die, with reflector and/or transducer elements located on both sides of the I/O transducer.

Various mounting techniques, including cantilevered mounting, solidly mounted die, and partially mounted die have been shown. In a cantilevered mount, the SAW die is held firmly at one end, or is solidly attached to a fixed rigid body for a portion of the die, and the remainder of the die is unsupported, allowing it to flex in a direction perpendicular to the surface of the die when a force is applied in this direction. This approach has been used to measure force and strain. Solidly mounted die, where the entire die is firmly adhered to the object in which strain is to be measured, have been used to directly measure strain. Partially mounted die, where a portion of the die is firmly attached to the object in which strain is to be measured and other portions of the die remain unattached to avoid transfer of mechanical stresses to those portions of the die (as in Schwartz, or as in two-sided die where one side is firmly attached and the other end is not attached) have been used to measure strain in the object on which they are mounted, while also providing some degree of temperature compensation.

A variation of these approaches, with a portion of the die supported and another portion acting as an unsupported membrane that can respond to forces perpendicular to the die surface has been reported by multiple researchers for use as a pressure sensor. Other mounting methods use flip-chip configurations to expose different portions of the die to different forces, for use as pressure sensors, among other uses.

The impact of temperature on SAW-based measurements of strain must be taken into account in order to achieve accurate strain measurements, since the impact of temperature on responses can (in certain materials) be a larger effect than the impact of strain on the measured parameters. While this need is universally understood, in many conventional research studies the effect of temperature is not addressed at all, or is noted as something that needs to the addressed in future work in order to achieve a useful strain sensor. For example, Wolff et. al discusses cross sensitivity, stating that on YZ LiNbO$_3$ "a temperature variation of 10° C. yields the same change in delay time as straining the crystal to its fracture limit." Wolff, U., Dickert, F. L., Fischerauer, G. K., Greibl, W., Ruppel, C., "SAW sensors for harsh environments", *IEEE Sensors Journal*, Vol. 1, No. 1, pp. 4-13, June 2001. Wolff further discloses that frequently residual temperature sensitivity cannot be eliminated by simple linear signal processing. Humphries claims measurement of strain with resolution as small as 10µε with a YZ-LiNbO$_3$ (Y-cut Z-propagating) OFC (orthogonally frequency coded) SAW strain sensor comprising a reflective delay line with a transducer in center and OFC reflector banks on each end of die, used in a cantilever configuration. Humphries, J., "Passive, Wireless SAW OFC Strain Sensor and Software Defined Radio Interrogator", Ph.D. Thesis, University of Central Florida (2016). For example, Humphries states, "It is assumed that the temperature will remain constant during the measurements as the SAW device is also sensitive to temperature. This is accomplished by thermally insulating the sensor from the surrounding environment". FIG. 3-20 of Humphries shows residual temperature drift in measurements made. Further, Humphries states, "Some error is still present due to temperature effects and hysteresis caused by the adhesive used to attach the sensors to the test structure. Temperature compensation and improvement of the SAW sensor installation process would further improve the sensor performance." Altogether, Humphries mentions future designs would need to incorporate "some temperature compensation technique such as differential measurements or thin film temperature compensation, for accurate strain extraction."

As in Schwartz, differential measurements are widely used to provide some degree of temperature compensation. Kalinin states, "One of the resonators or delay lines is used as a reference so differential measurements allow excluding the influence of the interrogator and sensor positions on the results of the measurements. Obviously the reference resonator should remain unstrained (or strained differently) in the case of strain measurements." Kalinin, V., "Passive Wireless Strain and Temperature Sensors Based on SAW Devices", *IEEE* (2004). While this does not address temperature compensation per se, it exemplifies the use of differential measurements to take into account other factors common to the response of multiple devices. Other researchers also utilize multiple SAW elements at different orientations on the same substrate [often 90 degrees apart] in one sensor, with differential measurement of either delay or resonant frequency to achieve temperature compensation and eliminate sensitivity to other factors such as shaft bending as in Beckley et al. Beckley, J., Kalinin, V., Lee, M., Voliansky, K., "Non-contact torque sensors based on SAW resonators", *Proceedings of the* 2002 *IEEE International Frequency Control Symposium and PDA Exhibition*, pp, 202-213 (2002). Stoney et al. teaches use of two SAW resonators on two separate die for passive wireless differential strain measurement. Stoney, R., Geraghty, D., and O'Donnell, G. E., "Characterization of Differentially Measured Strain Using Passive Wireless Surface Acoustic Wave (SAW) Strain Sensors", *IEEE Sensors Journal*, Vol. 14, No. 3., March 2014. The AST (apparent strain due to temperature) can be reduced by this differential measurement. Stoney further discloses that the apparent strain due to temperature (AST) has been reduced down to 2.7% of full scale output from 0° C. to 100° C. Strain resolution down to 1 µs was reported. In one test, two sensors were mounted on opposite sides of the test article, so that when one device is exposed to tension the other experiences compression, and vice-versa. Other tests used resonators mounted perpendicular to one another. Stoney attributes AST to the adhesive and its curing, and states, "Complete elimination of the AST can be realized by implementing an equivalent sensing system with two SAWR elements manufactured on a single die".

Maskay et. al. use a SAW resonator (SAWR) on langasite (LGS) with a second SAWR as a temperature sensor to numerically compensate for temperature fluctuations, essentially subtracting the frequency shift due to temperature from that due to temperature and strain. Maskay, A., and Pereira da Cunha, M., "High Temperature Static Strain Microwave Acoustic Sensor", 2016 *IEEE International Ultrasonics Symposium Proceedings*. This temperature sensor was "placed in close proximity to the strain sensor, but allowed to move freely on the surface of the beam, thus unresponsive to the beam loading." Id. Thus, this work again recognized need to isolate the temperature die from strain, but this configuration—with a SAW die unattached and only connected by electrical bond wires, is a completely unworkable in practice because of its fragility.

Cobianu et. al. in EP 2554962A1 teaches a SAW strain sensor embodiment that is more well suited to mass production processes. This sensor comprises two chips, each with one or more SAW sensors, that are bonded together as a package using mechanically compliant material, with the acoustically active surfaces of the two ships facing towards one another across a space formed by the bonding material. One chip is firmly attached to the article in which strain is to be measured, while the other chip remains relatively free of strain due to the soft, compliant nature of the bonding agent. Theoretically, in this configuration the unstrained die can provide a measure of temperature that can be used to subtract out the effects of changes in temperature from the effects of changes in temperature and strain that the die adhered to the article being measured experiences. For this to work well, however, some practical considerations must be met. First, the compliant bonding agent must not transfer any strain to the temperature sensor die. However, of conventionally available mechanically compliant bonding agents, any that were strong enough to adequately attach the die to a carrier also transferred enough strain to the die to prevent complete temperature compensation. Changes in the bonding agent with temperature, and their influence on the strain state of the temperature die must also be taken into account. Second, the bonding agent must be thermally conductive enough to cause the temperature sensing die to rapidly reach the same temperature as the strained die. Any lag time in the two die reaching thermal equilibrium results in errors in strain measurement (apparent strain due to temperature, or AST).

Hence, other approaches to temperature compensation in SAW strain sensors (and other SAW sensors) that are highly manufacturable are sought.

SUMMARY

The following presents a simplified summary in order to provide a basic understanding of some aspects described herein. This summary is not an extensive overview of the claimed subject matter. It is intended to neither identify key or critical elements of the claimed subject matter nor delineate the scope thereof. Its sole purpose is to present some concepts in a simplified form as a prelude to the more detailed description that is presented later.

The present disclosure provides an improved SAW sensor that is inherently temperature compensated with improved sensitivity, relative to the prior art. The disclosed sensor is configured to measure multiple parameters in a temperature compensated manner, provided appropriate isolation of the reference die from the influences of the parameter being measured. The present disclosure also provides an advanced SAW strain sensor package that, together with the disclosed, improved SAW sensor, produces a SAW strain sensor with inherent temperature compensation over an arbitrarily wide temperature range. This improved sensor has been used to demonstrate strain measurement resolutions of better than $0.2\mu\varepsilon$. Further, the present disclosure produces an encapsulated SAW strain sensor that can be handled without concerns for cleanliness, and can be attached to articles in which strain is to be measured using a range of methods, including welding, bolting, or any of a range of adhesives.

The bulk of this disclosure refers to implementation of improved SAW strain sensors. The present disclosure further contemplates that an improved device embodiment, which provides temperature compensation in SAW sensors, can be used to implement any of a variety of measurements, provided the reference die and the measurement die both respond to changes in temperature in the same manner, and provided that the reference die is isolated from the influence of the parameter to be measured. Strain measurement is just one illustrative case. The advanced SAW strain sensor package and the SAW device embodiments included in the present disclosure are described separately.

The present disclosure provides a temperature compensated acoustic wave sensor apparatus. The sensor apparatus includes a first acoustic wave device die that is responsive to temperature and at least one second acoustic wave device die that is responsive to temperature and is responsive to at least one other environmental property. Each of said acoustic wave device die comprises a piezoelectric substrate and at least one first surface acoustic wave element comprising a first transducer formed on said piezoelectric substrate. Said first transducer comprises electrode structures capable of generating and receiving acoustic waves along a direction of acoustic wave propagation. The sensor apparatus further includes a package configured to house and provide mechanical protection for the first and at least one second acoustic wave device die and to provide electrical interconnection to said at least one first transducer on each of said die. Said package is thermally conductive and maintains both die at the same temperature. Said package isolates said first acoustic wave device die from being influenced by said at least one other environmental property. Said package exposes said at least one second acoustic wave device die to be influenced by said at least one other environmental property. Said first acoustic wave device die further comprises at least one second surface acoustic wave element and at least one third surface acoustic wave element. Said at least one second surface acoustic wave element is formed on said piezoelectric substrate and spaced apart from said first transducer along the direction of acoustic wave propagation at a first distance to provide a first acoustic delay. Said at least one second surface acoustic wave element comprises electrode structures capable of interacting with acoustic waves at frequencies that correspond to the frequencies generated by said at least one first transducer. Said at least one third surface acoustic wave element is formed on said piezoelectric substrate and spaced apart from said first transducer along the direction of acoustic wave propagation at a second distance to provide a third acoustic delay. Said at least one third surface acoustic wave element comprises electrode structures capable of interacting with acoustic waves at frequencies that correspond to the frequencies generated by said at least one first transducer. Said at least one second acoustic wave device die further comprises at least one second surface acoustic wave element formed on said piezoelectric substrate and spaced apart from said first transducer along the direction of acoustic wave propagation at a third distance to create a second acoustic delay. Said at least one second surface acoustic wave element comprises electrode structures capable of interacting with acoustic waves at frequencies that correspond to the frequencies generated by said at least one first transducer. A first differential delay is equal to the difference between said second acoustic delay and said first acoustic delay. A second differential delay is equal to the difference between said third acoustic delay and said second acoustic delay. Said first differential delay and said second differential delay are equal when said first and said at least one second acoustic wave device die are at the same temperature and said at least one second acoustic wave device die is isolated from other environmental effects that influence its response. The difference between said first differential delay and said second differential delay provides a measurement of said at least one other environmental property, wherein the measurement is independent of temperature.

In some examples of the sensor apparatus, a third differential delay is equal to the difference between said third acoustic delay and said first acoustic delay; and said third differential delay is indicative of the temperature of the sensor apparatus over a selected temperature range.

In some examples of the sensor apparatus, said first acoustic wave device die further comprises at least one fourth surface acoustic wave element formed on said piezoelectric substrate of the first acoustic wave device and spaced apart from said first transducer along the direction of acoustic wave propagation at a fourth distance to create a fourth acoustic delay. Said at least one fourth surface acoustic wave element comprises electrode structures capable of interacting with acoustic waves at frequencies that correspond to the frequencies generated by said at least one first transducer. A third differential delay is equal to the difference between said third acoustic delay and said first acoustic delay. A fourth differential delay is equal to the difference between said fourth acoustic delay and said third acoustic delay. A fifth differential delay is equal to the difference between said fourth acoustic delay and said first acoustic delay. Said third, fourth, and fifth differential delays taken together are capable of being used to determine the temperature of the sensor apparatus.

The present disclosure further provides for a set of individually identifiable, inherently temperature compensated acoustic wave sensors comprising two or more sensor apparatuses (e.g., the sensor apparatus as described above). Each sensor apparatus in said set produces at least three acoustic responses that occur at separate times within a defined time range for that sensor apparatus. The acoustic responses from each sensor apparatus occur within a defined time range that does not contain any acoustic responses from other sensor apparatuses in the set.

The present disclosure further provides for a set of individually identifiable, inherently temperature compensated acoustic wave sensors comprising two or more sensor apparatuses (e.g., the sensor apparatus as described above). Each sensor apparatus in said set produces at least three acoustic responses that occur at separate times. Individual acoustic responses from the sensor apparatuses are interleaved in time, such that any time range that encompasses all of the acoustic responses from one sensor apparatus necessarily also includes at least one acoustic response from a different sensor apparatus in the set.

In some examples of the sensor apparatus, the at least one other environmental property comprises strain. Said package further includes a package base that isolates said first acoustic wave device die from being influenced by strain and exposes said at least one second acoustic wave device die to be influenced by strain. Said package base comprises at least two sides, a temperature side and a strain side, each with portions for mounting acoustic wave device die. Said sides of the package base are mechanically separated from one another between the die mounting portions of the base. Said package base further comprises a connected end that joins the temperature side and the strain side at one end of the package base, and said package base further comprises mounting portions at both ends of the strain side, for attaching the strain measurement apparatus to an object to be measured. Said first acoustic wave device die is mounted to said temperature side of said package base and at least one second acoustic wave device die is mounted to said strain side of said package base.

In some examples of the sensor apparatus, one or more of said surface acoustic wave elements include dispersive or coded structures.

In some examples of the sensor apparatus, said first acoustic wave device die or said at least one second acoustic wave device die further comprises SAW elements that are electrically connected to variable impedance elements for measuring at least one property of an environment of the apparatus.

In some examples of the sensor apparatus, changes in frequency, amplitude, delay, phase, or any combination of these are used as measurands.

The present disclosure further provides a package base for use in a temperature compensated sensor apparatus for measuring strain in an object the sensor apparatus is mounted on. Said sensor apparatus includes one first sensor device responsive to temperature and at least one second sensor device responsive to both temperature and strain. Said package base is comprised of thermally conductive material to maintain said first and second sensor devices at the same temperature. Said package base comprises at least two sides, a temperature side and a strain side, each with portions for mounting sensor devices. Said sides of the package base are mechanically separated from one another between the sensor mounting portions of the base. Said package base further comprises a connected end that joins the temperature side and the strain side at one end of the package base and further comprises mounting portions at both ends of the strain side, for attaching the strain measurement apparatus to the object. Said package base isolates said first sensor device from being influenced by strain and exposes said at least one second sensor device to be influenced by strain.

In some examples, the package base further comprises thinned sensor mounting portions on at least the underside of the base to provide a recess to prevent deflection of the object from causing the object to contact said temperature side.

In some examples, the mounting portion of the strain side further comprises at least one laterally narrowed sensor mounting portion, thereby producing an enhanced strain sensitivity.

In some examples, the package base further comprises walls around said temperature side to mechanically stiffen said side.

In some examples, the package base further comprises a thinned region between said connected end of said package base and said temperature side to provide a preferential location for bending of said temperature side should the object contact said temperature side when under deflection.

In some examples, the package base further comprises a continuous base portion that extends from the connected end around the entire perimeter of said base, wherein said continuous base portion is disconnected from said temperature side at the end of the temperature side most distant from said connected end in an operational sensor apparatus.

Other features and characteristics of the subject matter of this disclosure, as well as the methods of operation, functions of related elements of structure and the combination of parts, and economies of manufacture, will become more apparent upon consideration of the following description and the appended claims with reference to the accompanying drawings, all of which form a part of this specification, wherein like reference numerals designate corresponding parts in the various figures.

BRIEF DESCRIPTION OF THE FIGURES

The accompanying drawings, which are incorporated herein and form part of the specification, illustrate various embodiments of the subject matter of this disclosure. In the drawings, like reference numbers indicate identical or functionally similar elements.

FIG. 11 shows a table with improvements in strain measurement precision achievable using the improved 3 peak (3 acoustic response) approach of the present disclosure over a 4 peak approach, for a given die size.

DETAILED DESCRIPTION

Figure 1A:
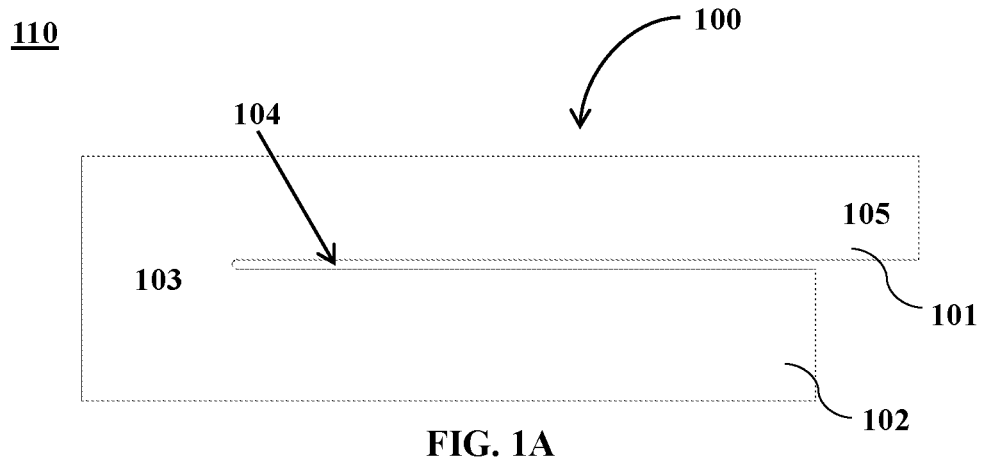
FIGS. 1A-1C show top (FIG. 1A), side (FIG. 1B), and bottom (FIG. 1C) views of an exemplary SAW strain sensor package base, according to an embodiment of the present disclosure.
Figure 1B:
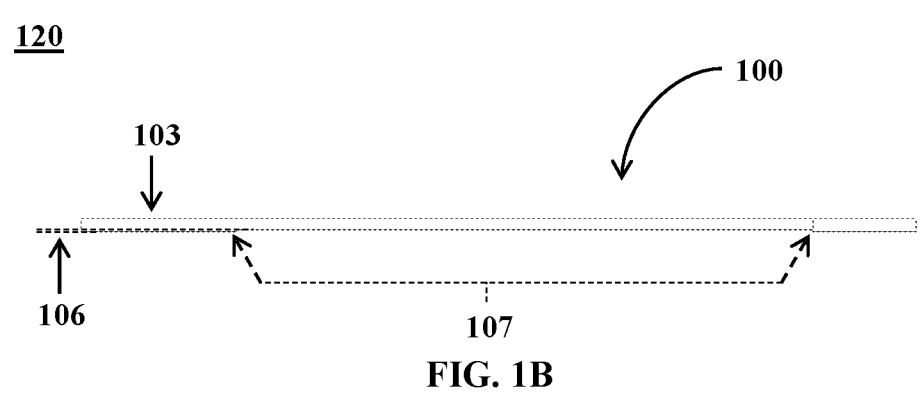
Figure 1C:
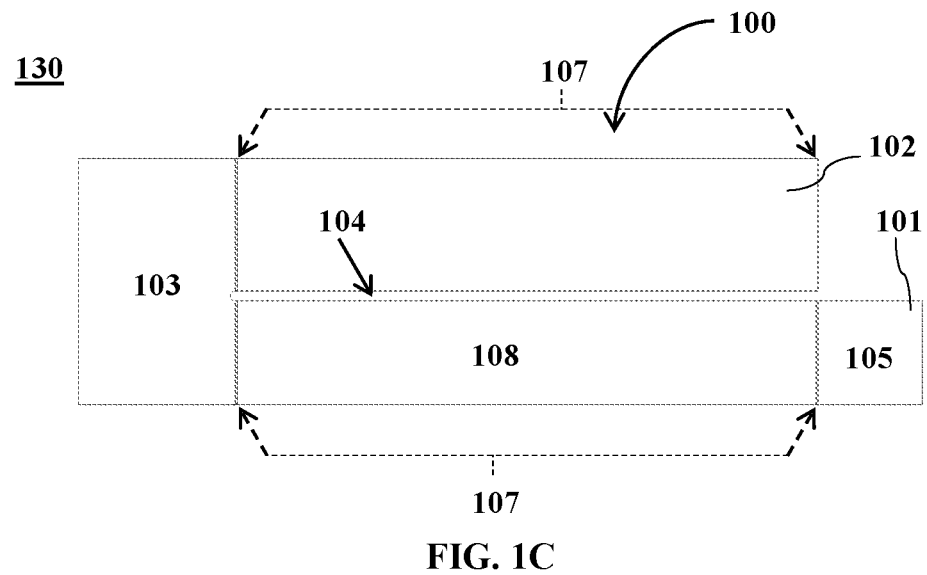

While aspects of the subject matter of the present disclosure may be embodied in a variety of forms, the following description and accompanying drawings are merely intended to disclose some of these forms as specific examples of the subject matter. Accordingly, the subject matter of this disclosure is not intended to be limited to the forms or embodiments so described and illustrated.

Unless defined otherwise, all terms of art, notations and other technical terms or terminology used herein have the same meaning as is commonly understood by one of ordinary skill in the art to which this disclosure belongs. All patents, applications, published applications and other publications referred to herein are incorporated by reference in their entirety. If a definition set forth in this section is contrary to or otherwise inconsistent with a definition set forth in the patents, applications, published applications, and other publications that are herein incorporated by reference, the definition set forth in this section prevails over the definition that is incorporated herein by reference.

Unless otherwise indicated or the context suggests otherwise, as used herein, "a" or "an" means "at least one" or "one or more."

This description may use relative spatial and/or orientation terms in describing the position and/or orientation of a component, apparatus, location, feature, or a portion thereof. Unless specifically stated, or otherwise dictated by the context of the description, such terms, including, without limitation, top, bottom, above, below, under, on top of, upper, lower, left of, right of, in front of, behind, next to, adjacent, between, horizontal, vertical, diagonal, longitudinal, transverse, radial, axial, distal, proximal, inferior, end, etc., are used for convenience in referring to such component, element, apparatus, location, feature, or a portion thereof in the drawings and are not intended to be limiting.

Furthermore, unless otherwise stated, any specific dimensions mentioned in this description are merely representative of an exemplary implementation of a device embodying aspects of the disclosure and are not intended to be limiting.

To the extent used herein, the term "adjacent" refers to being near or adjoining. Adjacent objects can be spaced apart from one another or can be in actual or direct contact with one another. In some instances, adjacent objects can be coupled to one another or can be formed integrally with one another.

To the extent used herein, the terms "substantially" and "substantial" refer to a considerable degree or extent. When used in conjunction with, for example, an event, circumstance, characteristic, or property, the terms can refer to instances in which the event, circumstance, characteristic, or property occurs precisely as well as instances in which the event, circumstance, characteristic, or property occurs to a close approximation, such as accounting for typical tolerance levels or variability of the embodiments described herein.

To the extent used herein, the terms "optional" and "optionally" mean that the subsequently described, component, structure, element, event, circumstance, characteristic, property, etc. may or may not be included or occur and that the description includes instances where the component, structure, element, event, circumstance, characteristic, property, etc. is included or occurs and instances in which it is not or does not.

Advanced SAW Strain Sensor Package

As discussed previously, temperature compensation in SAW strain sensors can be accomplished (among other methods) using any method that effectively separates the influence of temperature and the combined influence of temperature and strain into different portions of the measurement apparatus that perform the acoustic wave measurement. This can be achieved in a single die, or alternatively, it can be accomplished by using two separate SAW die; one of which is rigidly attached (or bonded) to the sample for sensing mechanical strain, and the other of which is not bonded to the sample experiencing strain, but is instead attached to the package with the sole purpose of mimicking the thermal behavior of the strain sensing die.

This disclosure provides an improved package for SAW strain sensors that provides for inherent separation of the influences of (1) temperature on the temperature sensing die and (2) strain and temperature on the strain sensing die. Put differently, this improved SAW package exposes the strain measurement die to the influences of both strain and temperature, while completely preventing the transfer of strain due to the sample under test to the temperature measurement die. This package structure ensures good thermal contact between both SAW die and the package, and allows for use of the same thermally conductive adhesive for both die (which ensures good match of the temperature response of the two die), two features of the package that help to ensure good temperature compensation of strain measurements. Further, the advanced SAW strain sensor package of the present disclosure produces an encapsulated SAW strain sensor that can be handled without concerns for cleanliness, and can be attached to articles in which strain is to be measured using a range of methods, including welding, bolting, or any of a range of adhesives. For example, the present disclosure provides for spot welding to ensure a solid attachment between the SAW strain sensor package of the present disclosure and the article to which the SAW strain sensor package is attached (provided that the article can be welded).

The improved SAW strain sensor package according to the present disclosure can be described at a high level as a "split shim" metal base (or carrier) with two sections, one for each SAW die, insulating regions and conductive regions on the shim (some conductive regions being electrically isolated from the base and others of which may be electrically in contact with the base), and bathtub covers attached (preferably with an attachment method that is compliant and/or does not mechanically stiffen the device to a significant degree) after device assembly to protect the die. The package was developed to allow use of standard SAW manufacturing processes (such as die attach) and equipment (such as wire bonders to make electrical connections between the die and the package). While some embodiments described herein utilize metal split-shim carriers, the present disclosure further contemplates use of any thermally conductive material for the carrier or base).

Figure 2A:
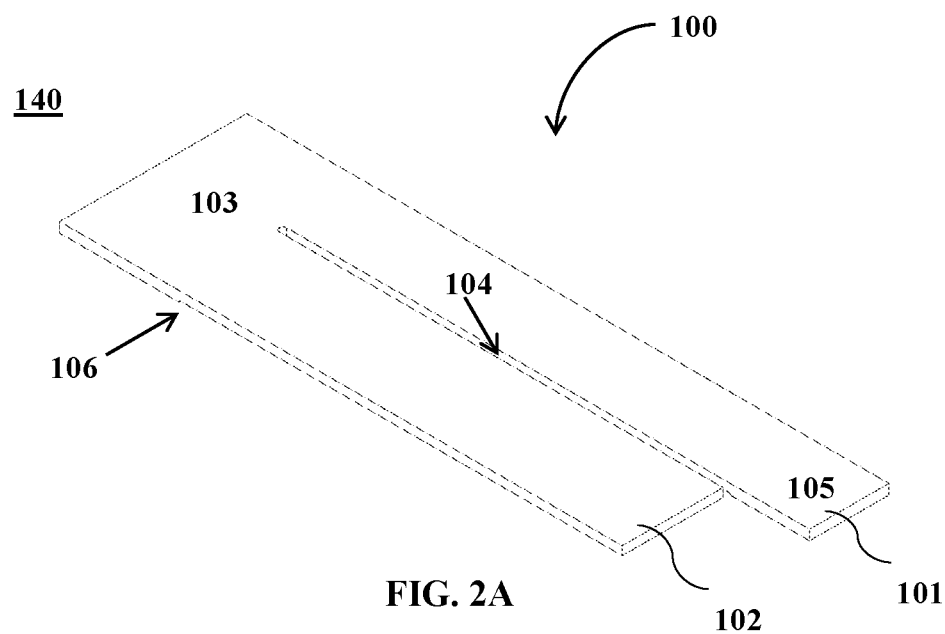
FIGS. 2A-2B show isometric views from the top (FIG. 2A) and bottom (FIG. 2B) perspectives of the exemplary SAW strain sensor package base of FIGS. 1A-1C, according to an embodiment of the present disclosure.
Figure 2B:
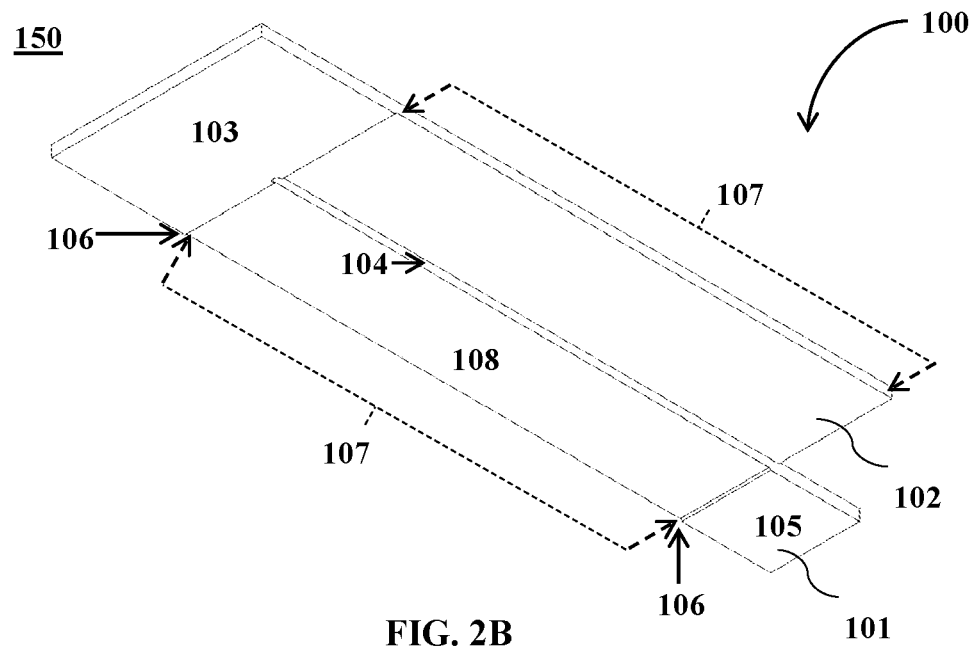

FIGS. 1A-2B show various views of an exemplary SAW strain sensor package base 100 that utilizes a split-shim concept, according to an embodiment of the present disclosure. View 110 of FIG. 1A is a top down view, view 120 of FIG. 1B is a side view as seen from the lower edge of the top view 110, and view 130 of FIG. 1C is a bottom view of the base 100. View 140 of FIG. 2A is an isometric view of the split-shim base 100 as seen from above, and view 150 of FIG. 2B is an isometric view of the split-shim base 100 as seen from below. A SAW strain sensor made using the split-shim package according to the present disclosure utilizes two separate SAW die, one for measuring temperature only and the second for measuring both temperature and strain. The two die are attached (for example, using a thermally conductive epoxy or similar adhesive) to a metal shim 100 such as that shown in FIGS. 1A-1C. For example, the package base has a form factor allowing the package base to fit in a wire bonder, which is used to wire bond acoustic elements (transducers and/or reflectors) on the SAW die to electrically conductive traces on the package base (or a flex circuit, ceramic carrier, or PCB); this wire bonding provides the necessary routes for electrical signals to travel in and out of the SAW die.

As mentioned above, in order for the temperature-compensating side to work properly, it must be isolated from mechanical strain. Prior testing using two SAW die on a single solid metal base has shown that the use of a thermally conductive, but mechanically compliant, epoxy for the temperature sensing die does a fair job of this; however, small amounts of mechanical strain are still transferred to this temperature-sensing die. Moreover, the thermal conductivity of this compliant epoxy does not match that of the more rigid epoxy used on the strain side, resulting in the temperature sensitivity of the strain side and the temperature side being different. These factors lead to inability to accurately compensate for temperature, resulting in poor strain measurements when temperature is varying. Thus, use of a compliant adhesive for the temperature sensing die is not a good approach.

By contrast, the present disclosure contemplates a split-shim approach which provides for both die to be bonded with the same adhesive, while providing complete mechanical isolation of the temperature side. This is done by physically splitting the shim 100 into two halves or portions 101 and 102 (which, in some examples, are equal sizes, and, in alternate examples, unequal sizes) which are only connected at one end—the "connected end" 103. The split 104 between the portions 101, 102 can be formed by machining or by any other means appropriate for the material base of the shim 100, and need only be wide enough to provide room for device assembly (attachment of covers, etc.). The connected end 103 will be bonded fully (across both portions of the shim 100) to the material in which strain is to be measured (referred to herein as the "sample" or "measured object"), while at the far end of the shim base, only the portion 105 of the shim 100 with the strain-sensing SAW die 101 (the "strain side") will be bonded to the sample. The side of the shim 100 with the temperature sensing die 102 (the "temperature side") will remain unattached (not attached to the sample at all) on the far end, ensuring that it is not affected by any mechanical strain in the sample being measured. As the sample is strained, the strain side 101 experiences strain, while the temperature side 102 remains 'floating' and unaffected by strain.

To further protect the temperature side 102 from experiencing mechanical strain, a small gap 106 is produced beneath the portion 102 of the shim 100 to which the temperature sensing die (not shown in FIGS. 1A-2B) is adhered, by recessing the surface of the shim 100. This prevents the sample from interacting with the shim 100 through friction or interference due to the sample bending towards the shim 100 and thereby contacting the shim 100 (which could introduce a strain in the temperature sensor die). This gap 106 (or recessed region) may also be present beneath the strain die as indicated by recessed regions 107 in FIGS. 1B, 1C, and 2B, so that the two sides 101, 102 exhibit the same thermal behavior. This produces a thinned region 108 between the two bonded ends of the strain-sensing side (e.g., connected end 103 and portion 105), which increases the mechanical strain observed by the die on that side.

Depending on the amount of deflection expected in the sample, additional features may be present on the temperature side 102 of the shim 100 to reduce any mechanical interaction between the sample and the SAW die. For example, these features include "walls" surrounding the die-bonding region (generally on the upper surface of the base 100), which improve the stiffness in the longitudinal direction. For example, these features further include a section of reduced thickness on the temperature side 102 of the shim 100, between the connected end 103 of the shim 100 and the die-bonding region, which provides an intended location for bending of the temperature side 102 of the shim 100 to occur. The walls and section of reduced thickness together further protect the region of the shim 100 on which the temperature sensing SAW die is attached from translating any strain to the SAW temperature sensing die, should this portion of the shim 100 be bent upwards due to deflection of the sample applying force on the shim 100.

Figure 3A:
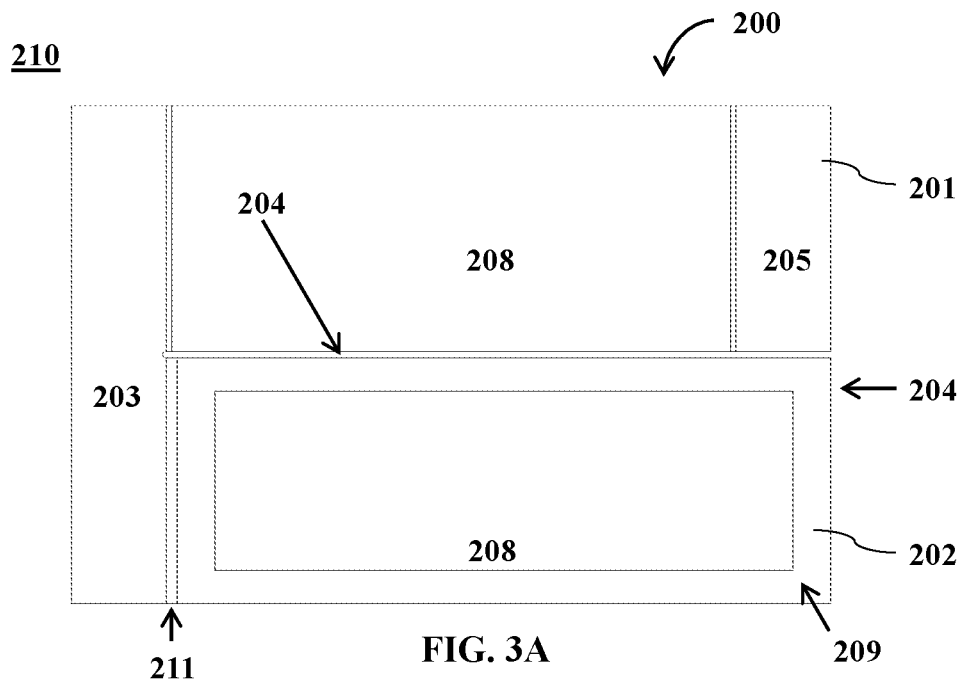
FIGS. 3A-3C shows a top (FIG. 3A) view and views from a first (FIG. 3B) and second (FIG. 3C) side of another exemplary SAW strain sensor package base with thinned regions, according to an embodiment of the present disclosure.
Figure 3B:
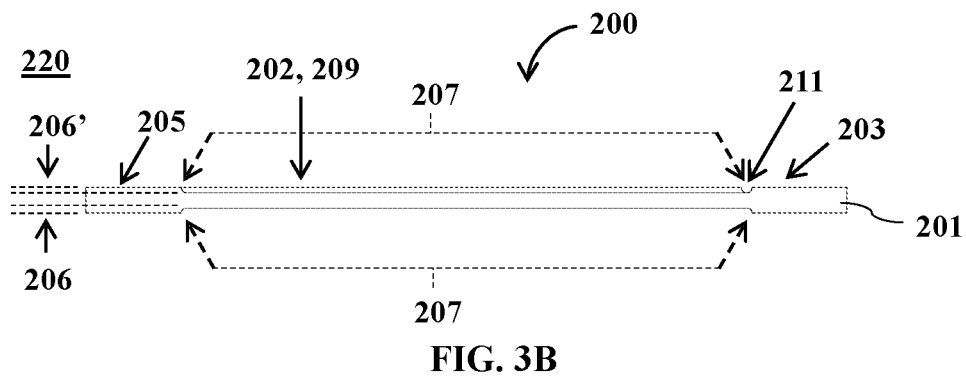
Figure 3C:
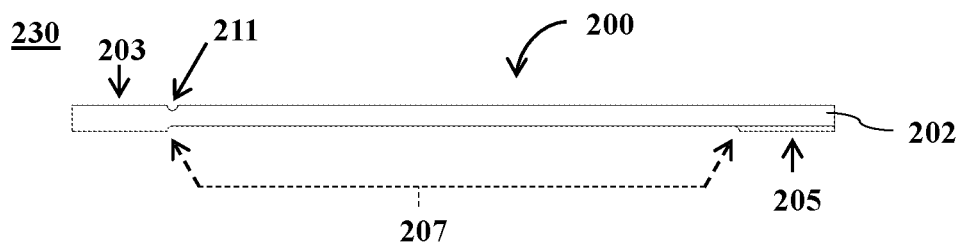

FIGS. 3A-3C show another exemplary package base 200, according to an embodiment of the present disclosure. A top view 210 of the package base 200 is shown in FIG. 3A, a first side view 220 of the package base 200 is shown in of FIG. 3B as seen from the strain sensor side 201, and a second side view 230 of the package base 200 is shown in FIG. 3C as seen from the temperature sensor side 202. Turning first to FIG. 3A, a gap 204 is shown between the two portions 201 and 202 of the shim 200. The connected end 203 is the left end. The strain measurement portion is the upper portion 201, which, for example, is firmly attached to the sample at (1) the connected end 203 and (2) at the far end 205 of portion 201 of the shim 100. The temperature side, which is only attached to the sample at the connected end 203, is the lower portion 202.

The embodiment shown in FIGS. 3A-3C includes optional walls 209, which serve to stiffen the temperature side 202. In an assembled strain sensor (or strain and temperature sensor), SAW die are mounted in the central regions of the upper 201 and lower 202 portions of the package base 200 (strain sensor measurement die on 201, temperature sensing die on the 202). In some examples, the lengths of the strain 201 and temperature 202 measurement portions of the package base 200 are be equal as shown in FIGS. 3A-3C, and, in alternate examples, the lengths of the strain 201 and temperature 202 measurement portions are unequal (e.g., as shown in FIGS. 1A-2B). In embodiments with unequal lengths, the temperature portion 202 may be shorter or longer than the strain portion 201, provided the end of the temperature portion 202 farthest from the connection end 203 remains mechanically unconnected from the object being strained. In some examples, the temperature portion 202 is the same width as the strain portion 201 as shown in FIGS. 3A-3C, and, in alternate examples, the temperature measurement portion 202 is narrower or (as shown in FIGS. 1A-3B) wider than the strain portion 201. The length and width of these portions 201, 202 of the package base 200 can be adjusted to accommodate die with one or more acoustic propagation paths (or "tracks"), or to accommodate one or more separate SAW die on each portion 201, 202. While not shown in the figures, in some examples, the strain portion 201 is laterally narrowed in a middle portion, with wider ends, in a "dog-bone" structure known to concentrate strain, for enhanced strain response levels in the SAW die.

The embodiment of FIGS. 3A-3C shows recessed regions 207 on both the top and bottom surfaces of the package base in the thinned areas 208 where the SAW die will be mounted. For example, the thinned portions 208, on which the SAW die can be mounted, have the same thickness on sections 201 and 202, to provide a common thermal performance. The recessed regions of FIGS. 3A-3C are more pronounced than those of FIGS. 1A-2B, producing larger gaps 206', between the upper surface of the connected region 203 and the upper mounting surface of sections 201 and 202, and larger gaps 206 between the bottom surface of the connected region 203 and the lower surface of the thinned regions 208 of sections 201 and 202.

In practice, the size of the gap 206 (or 206') or the recessed regions 207 of the back of the package base 200 on both sides (201 and 202), which produces enhanced strain sensitivity on the strain side 201 and prevents contact of the temperature side 202 with the sample being measured (in the event of modest compression), will be determined by the physical properties and anticipated deflection to be experienced by the object on which the strain sensor is to be mounted, when the object is under maximal load conditions. The SAW strain sensor package base 200 shown in FIGS. 3A-3C also includes a localized section of reduced thickness 211 on the temperature side of the shim 202, between the common end 203 (which will be bonded to the object or sample) and the SAW die mounting region, which provides an intended location at 211 where bending would preferentially occur in the event of sample deflection towards the base sufficient to cause bending of the temperature side 202. Taken together with the structural reinforcement provided by the wall 209 and/or by the cover used to complete the SAW temperature sensor die encapsulation (not shown), the localized section of reduced thickness 211 effectively prevents exposure of the temperature sensor die to strain in the event of sample deflection large enough to cause bending of the temperature side 202 of the shim package 200.

While the present disclosure focuses on the use of differential delay lines for temperature compensated strain measurement, it is contemplated that, in some examples, the split-shim package base 200 described herein is used with SAW resonators or delay lines in oscillators to produce strain measurements that have temperature compensation that is an improvement over other packaging as well. Also, precise temperature compensation would not be achieved for delay line oscillators operating at different frequencies, for the reasons previously discussed.

In order to electrically activate and read the SAW sensors, means must be provided to electrically connect the SAW die to the elements needed to transfer appropriate radio frequency signals (circuit traces, matching components, antenna(s), cables, etc.). Conductive traces, electrically insulated from the shim base 200 via thin layers (which may include anodization, oxide layers, or other thin or thick films) can be formed on the base 200 using appropriate techniques (such as sputtering, evaporation, plating, etc.), and provide electrical connections between the SAW die on each portion of the shim (201 and 202) and electrical connectors or leads on the connected portion 203 of the shim 200. For wireless use, an antenna may be formed using conductive traces and appropriate insulation on the common end of the shim, or on any appropriate portion of the base 200. Alternatively, conductive traces (microstrip, transmission line, or others) can be implemented on ceramic chip carriers, flex circuits, PCBs, or other electrical circuit carriers to provide electrical connectivity from an external antenna to the sensors and matching circuitry. An external antenna may be connected to the shim via coaxial cable, leads, or appropriate RF connectors. Impedance matching components, transient voltage suppression means, and other components can also be implemented on such electrical circuit carriers.

Figure 4A:
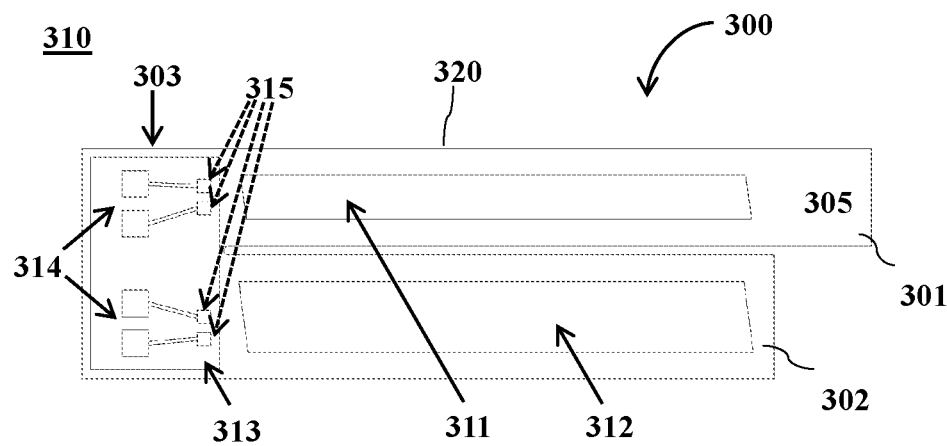
FIGS. 4A-4C depict an exemplary SAW sensor apparatus, according to an embodiment of the present disclosure.
Figure 4B:
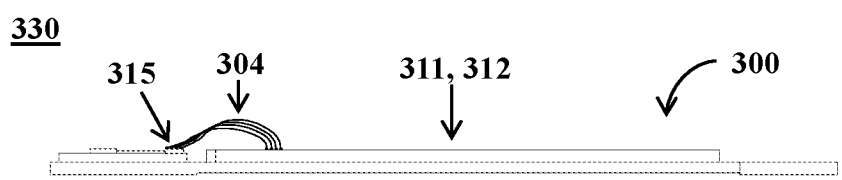
Figure 4C:
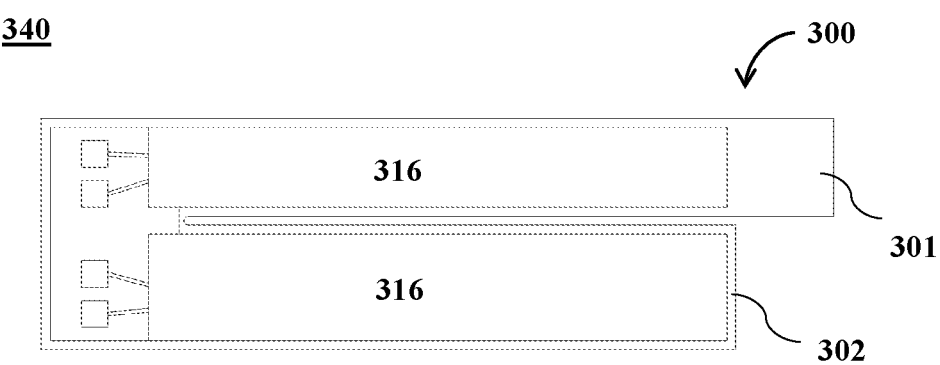

FIGS. 4A-4C show schematic representations of a partially assembled temperature compensated SAW strain sensor 300, according to an embodiment of the present disclosure. Top view 310 of FIG. 4A shows the split-shim base 320 comprising strain sensor side 301 and temperature sensor side 302, connected end 303, and strain sensor second attachment end 305. Mounted on the base are SAW strain and temperature sensing die 311 and SAW temperature sensing die 312, and circuit carrier 313 on which pads and traces 314 have been formed to provide circuit connectivity.

FIG. 4B provides a schematic representation of a side view 330 of a partially assembled temperature compensated SAW strain sensor 300, according to an embodiment of the present disclosure. In view 330, representations of bond wires 304 are shown connecting the input/output transducers on the SAW die to the pads or traces 314 on circuit carrier 313. Specially treated pads 315 suitable for wire bonding are included on the base 300 (or on the circuit carrier 313) to facilitate interconnection of the SAW die with industry standard wire bonding methods. Ball bonds are illustrated, as they are fairly standard in SAW manufacturing, but any of a variety of wire bonding techniques and materials can be used. Four bonding pads 315 are illustrated in FIGS. 4A-4C, to illustrate that each SAW die I/O transducer requires connections to a hot trace and to ground. This arrangement also permits the use of bond wires that are as short as possible. Separation of the traces for the two SAW die enables individual impedance matching, which adds flexibility. But other configurations, with the SAW die sharing one or more bond pads that are fed by a common hot trace, or where the SAW ground connection is made to the base (which is preferentially electrically connected to ground) are further contemplated by the present disclosure. Commonly used components such as impedance matching elements and antennas are not illustrated, but contemplated as well.

FIG. 4C provides a top view 340 of a partially assembled temperature compensated SAW strain sensor 300, according to an embodiment of the present disclosure where lids 316 (or covers) have been installed over the SAW die 311 and 312 and wire bonding regions (including wire bonds 304 and bonding pads 315) on both the strain measurement side 301 and the temperature compensation/measurement side 302. These covers 316 provide mechanical protection for the SAW die and bond wire connections, and may take various forms. In some examples, lids 316 are 'bathtub' lids that have a cavity and walls, and when positioned with the cavity down, fit over the desired area. These 'bathtub' lids 316 can be affixed to the base 300 with compliant adhesive to avoid increasing the stiffness of the sensor if desired (particularly on the strain side 301). Alternate configurations use walls around the SAW die to provide a location where a flat cover can be affixed at an appropriate elevation above the surface of the SAW die.

Once the covers 316 are in place, the sealed sensor module can be handled outside of a clean room environment without contaminating the SAW device surfaces or causing damage. Appropriate connections to any of a wide range of antennas can be provided (if an integral antenna on the base has not been provided). Whip, spiral, patch, transmission line, folded transmission line, spiral transmission line, fractal, inductive, and chip antennas are just some types of discrete antennas that can be used to provide a wireless interface to the sensor assembly, but any antenna providing good performance in the application environment can be used. Some embodiments of the present disclosure include an antenna integrated onto the base 300 and/or covers 316 for ruggedness. The strain sensing side of the sensor assembly (201 in FIGS. 3A-3C) can be spot welded at the ends 303 and 305, to ensure that strain in the measured object is transferred to the package base (and thus to the SAW die). Other attachment methods (bolt-on, adhesive, etc.) may be used instead to mount sections 303 and 305 to the article under test. The die adhesive used and the sensor assembly attachment method used may impact sensor sensitivity and hysteresis.

While the exemplary embodiments shown in the figures herein include recessed regions on the back of the base and thinned portions for enhanced strain sensitivity and thermal performance, using a split-shim base that is of uniform thickness, or using one that has no recesses on the back of the base, is further contemplated by the present disclosure. These approaches allow the solid attachment of the base along the entire length of the strain side 201, while leaving the temperature side 202 unattached.

Figure 5A:
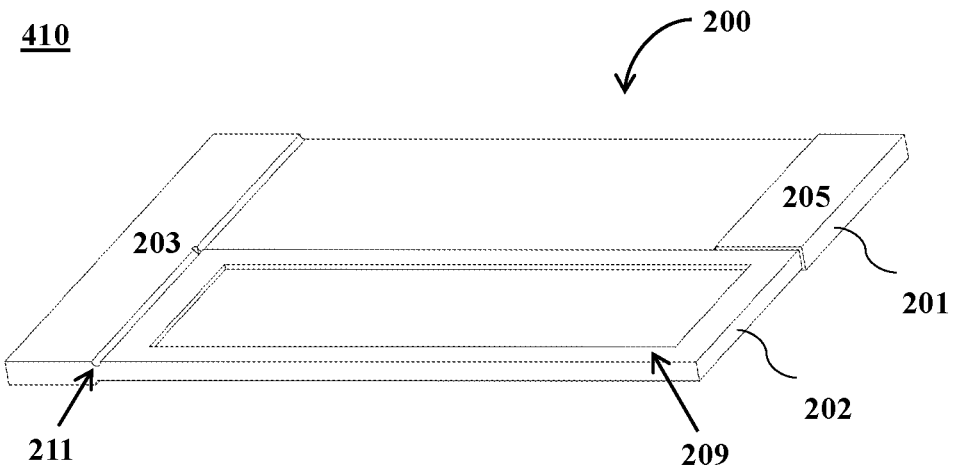
FIGS. 5A-5B show additional embodiments of exemplary SAW strain sensor package bases, according to the present disclosure.
Figure 5B:
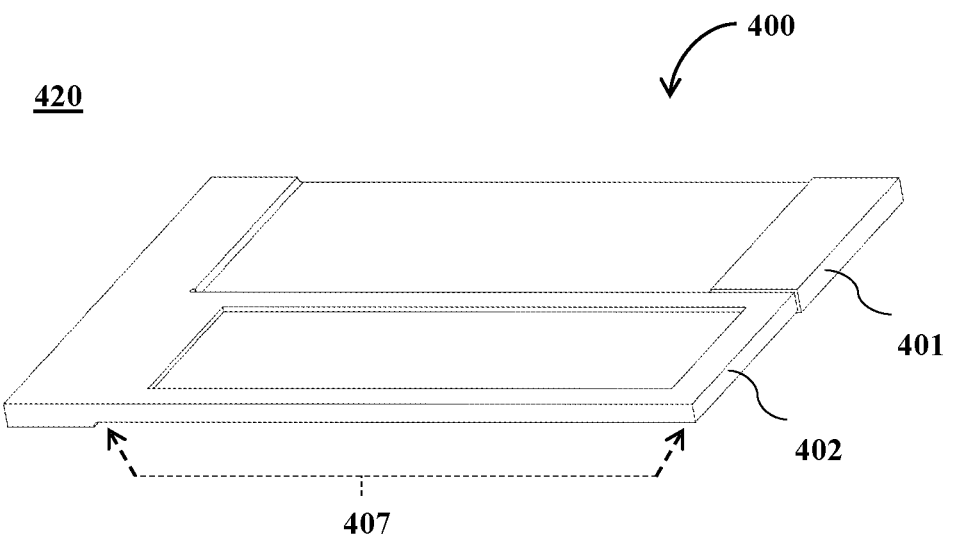

FIGS. 5A-6B show aspects of other embodiments of the present disclosure. These figures may exaggerate the size of specific aspects of the package for emphasis. In some examples, the overall thickness of the shim base is less than one millimeter (mm), and, in other examples, is larger. FIG. 5A shows an isometric view 410 of the package base 200 shown in FIGS. 3A-3C, and FIG. 5B shows an isometric view 420 of another exemplary package base 400 according to the present disclosure. As in FIGS. 3A-3C, the connected end 203 of strain sensor base 200 is the left end in view 410 of FIG. 5A. The strain measurement portion is the upper portion 201, which will be firmly attached to the sample at the connected end 203 and at the far end of portion 201 of the shim base, indicated by 205. The temperature side, which is only attached to the object being strained at the connected end 203 is the lower portion 202. Embodiment 200 includes optional walls 209 in to stiffen the temperature side 202. The height of the wall 209 is shown as providing an upper edge that is at the same height as the top of the connected region 203. The thinned region 211 is provided in this embodiment, as shown in FIGS. 3A-3C, to provide a preferential bending region if the article under strain on which the sensor is mounted is under compression sufficient to cause the surface of the article to apply a force to the free end of the temperature side 202. Embodiment 400 of the present disclosure, as shown in FIG. 5B, lacks this preferential bending location 211. For proper operation of this embodiment, the depth of recessed area 407 on the back of the base must be sufficient to avoid application of compressive strain on the temperature side 402 of the base. Either embodiment 200 or 400 of FIGS. 5A-5C can be formed by appropriate machining processes, which may require advanced machining such as electrical discharge machining (EDM) or other methods from a uniform starting thickness of sheet metal.

Figure 6A:
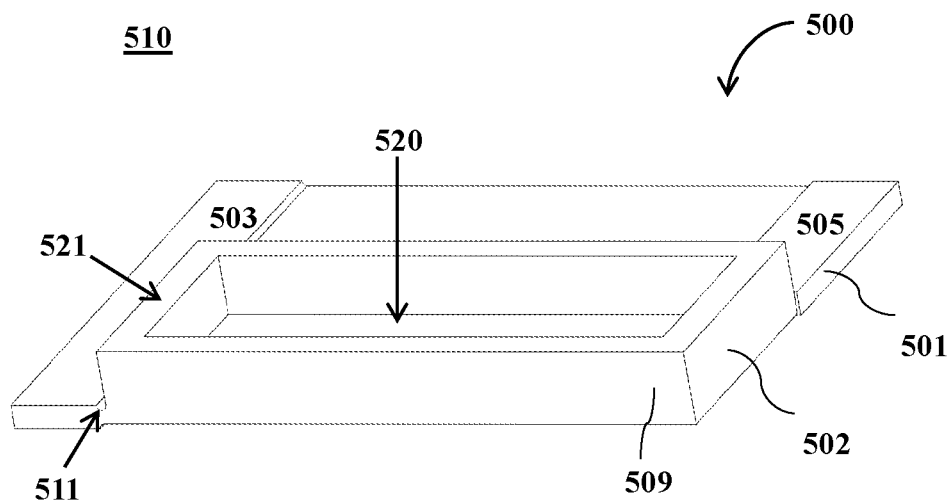
FIGS. 6A-6B show additional embodiments of exemplary SAW strain sensor package bases with integral and separate wall components, according to the present disclosure.
Figure 6B:
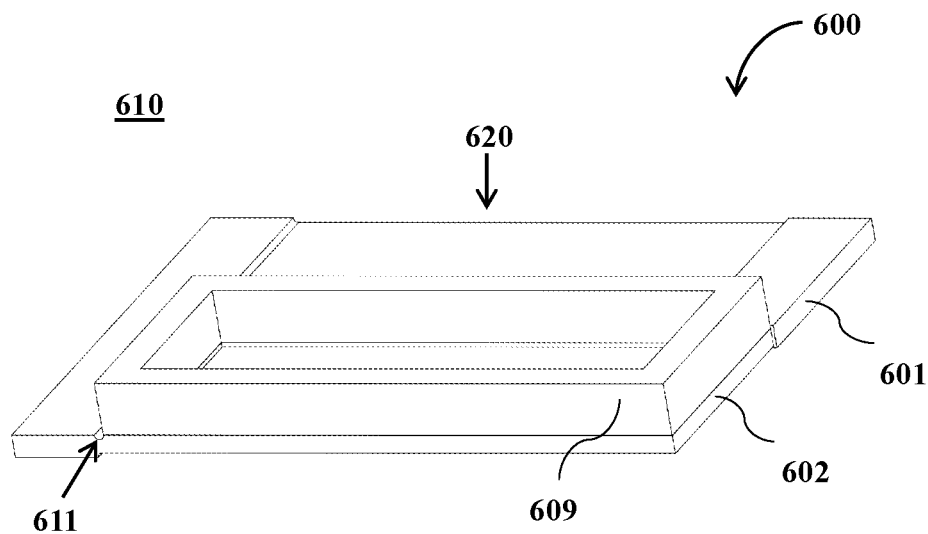

FIGS. 6A-6B shows two additional embodiments of the present disclosure, 500 (shown in FIG. 6A) and 600 (shown in FIG. 6B). Isometric view 510 of embodiment 500 includes strain side 501, temperature side 502, connected region 503, strain side attachment portion 505, wall 509 around the perimeter of the SAW die mounting region of temperature side 502, and preferential bending location 511. Note that in embodiment 500, the wall 509 is formed as an integral part of the sensor package base, as would be the case if the entire base is machined from a thick piece of starting material. Note also that the wall 509 in 500 is taller than the wall 209 in FIGS. 5A-5C, forming therewithin a cavity 520 that is deep enough to house the SAW die and bond wire connections. Means would be provided within the cavity to connect the SAW devices to electrical traces, as is done in ceramic surface mount packages where bond pads inside the package cavity are electrically connected to external pads or contacts on the package perimeter. The upper edge 521 of the wall 509 provides a surface for attaching a nominally flat cover to seal the SAW die in the temperature sensor side 502. Sealing can be accomplished by solder sealing, seal welding, adhesive lid attach, or other method. Since a high rigidity is desired for temperature side 502, the increase in stiffness associated with the wall 509 and lid attachment are not concerning.

Isometric view 610 in FIG. 6B shows another exemplary embodiment 600 of the present disclosure, comprising strain side 601 and temperature side 602. In embodiment 600, a separate wall 'ring' or section 609, which is formed separately from the base 620, is attached around the perimeter of the die attach region of temperature side 602 of the split-shim base. This embodiment has the benefit of providing flexibility in material choice for the wall ring 609, and the ability to form (or manufacture) the ring 609 with any offsets needed to interface properly with circuitry used to connect to the SAW sensors. This approach is thus easier to implement when using PCBs, flex circuits, or ceramic chip carriers as interface elements than an integrated wall approach (as shown by 509 in FIG. 6A) would be. As in other exemplary embodiments, a preferential bending location 611 is also included in 600.

Figure 7:
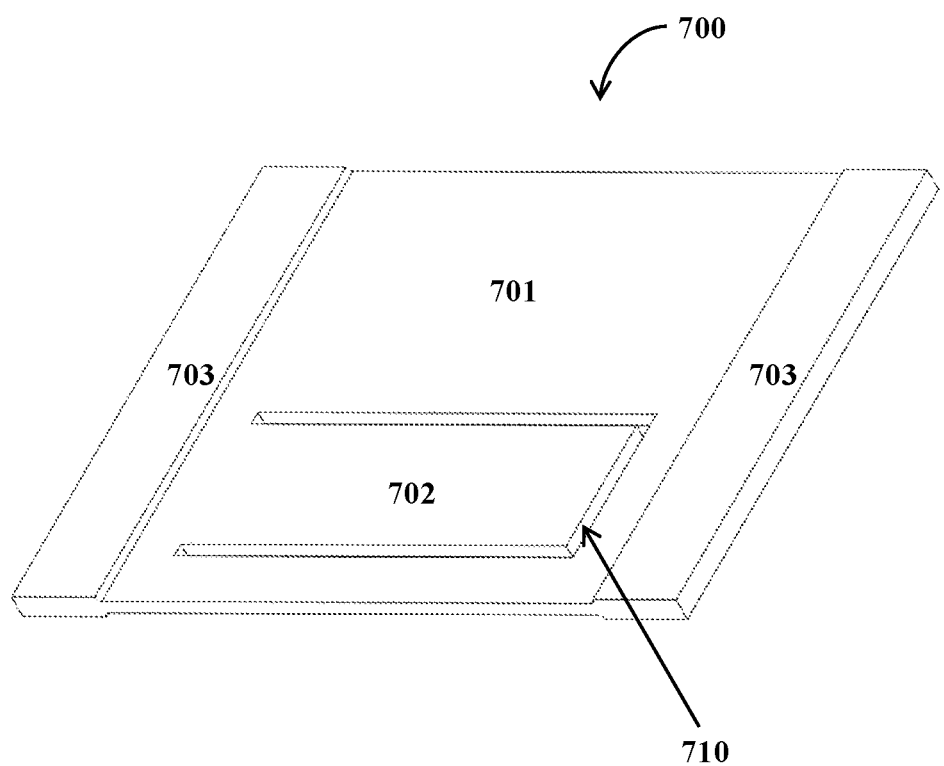
FIG. 7 shows another exemplary embodiment of a SAW strain sensor package base, according to the present disclosure, which can be machined as a seal-less base, instrumented and sealed, and later cut (as with a laser) to mechanically isolate the temperature sensing device from strain.

FIG. 7 shows an alternative embodiment 700 of the split-shim SAW strain sensor package base in which a continuous connected section encircles the entire shim, and the temperature sensor portion of the shim is disconnected at one end (the right end as shown by 710) from the connected section. This embodiment includes strain sensor portion 701, temperature sensor portion 702, and connected portions 703 on both ends. In use, both connected portions can be adhered firmly to the sample (the area between connected regions, under both the strain and the temperature side, remains unattached from the article under test). When strained, the SAW die on strain side 701 experiences strain, while the SAW die on temperature side 702 remains unstrained as end 710 is free to move. This embodiment may provide benefits in device handling and assembly, particularly if the temperature sensor portion of the shim can be left attached to the perimeter connected section during die mounting, die wire bonding, and package sealing steps, with the attachment broken to free the temperature sensor portion 702 once these manufacturing steps have been completed.

For all SAW package base embodiments discussed, the material used to build the base (which may be selected from aluminum, steel, or other thermally conductive materials) will also influence the strain response and the thickness needed to be well suited to use with SAW die. The choice of SAW substrate material will impact coefficient of thermal expansion preferences for the base material, and specific SAW die dimensions and manufacturing tolerances required between the SAW die edges and the cover attachment inner perimeter will impact the lateral dimensions of each portion of the shim. Use of bathtub covers is feasible with flat die attach sections, even with conductive traces and insulating layers. Compliant lid attachment materials may be beneficial. Use of a flat lid is possible for the temperature sensor die portion of the package, provided walls are provided for lid attachment and sealing. Similar sealing with a flat lid could be used on the strain side, provided the walls added to keep the lid up far enough to avoid contact with the SAW die and bond wires does not stiffen that side in a manner that prevents sufficient strain sensitivity. Projection welding, glass frit sealing, solder sealing, epoxy, and other methods can be used to seal bathtub style (cavity) lids onto the base to cover the SAW die. For shims made with walls, seam sealing, solder sealing, epoxy, and other known methods can be used for lid attach.

It will be clear to one versed in the art that this split shim package is advantageous for use with two-die SAW strain sensor embodiments that utilize any of a wide range of die configurations. The next sections discuss specific SAW strain sensor die embodiments that are inherently temperature compensated.

Temperature Compensated SAW Sensor Design

Figure 8A:
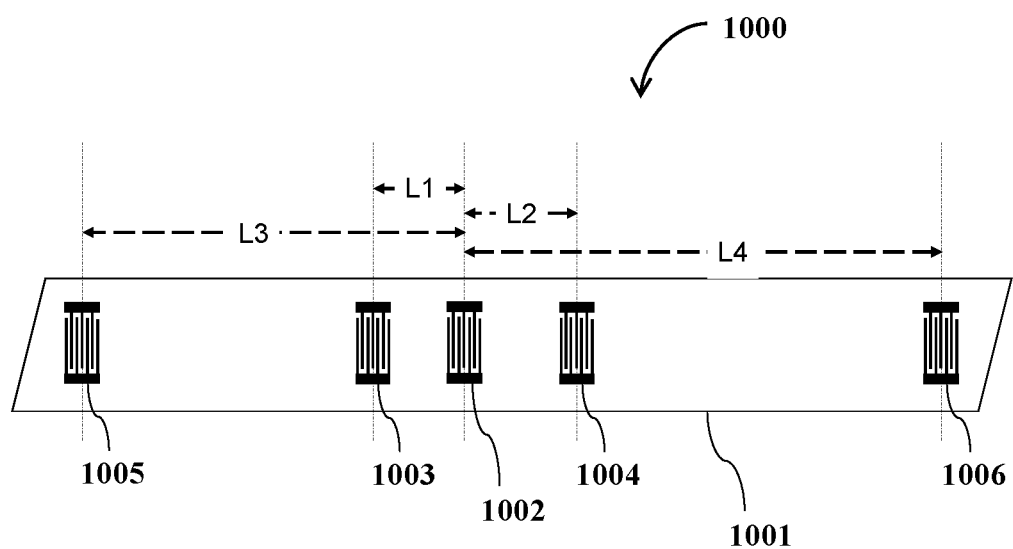
FIGS. 8A-8B show an exemplary single-die dual differential delay line approach to temperature compensated strain measurement, according to an embodiment of the present disclosure.
Figure 8B:
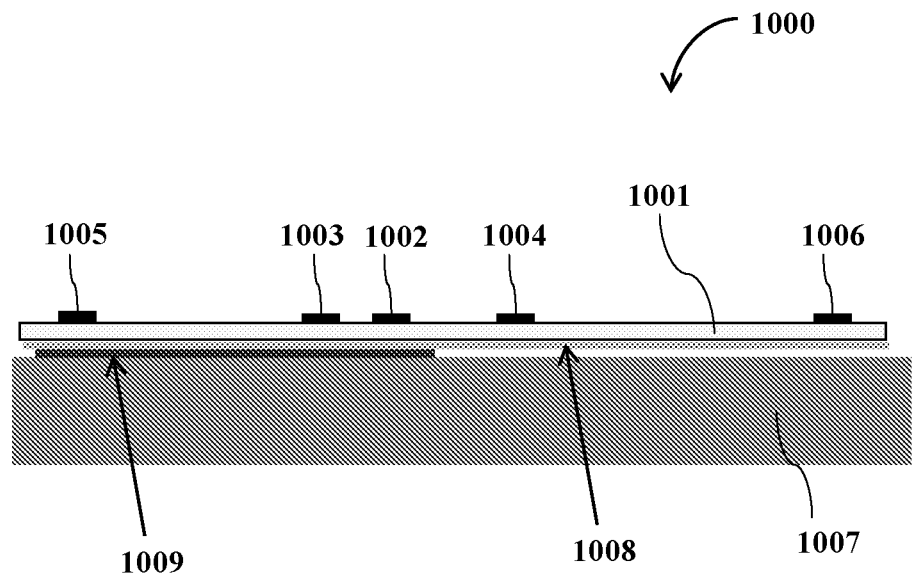

Temperature compensation in SAW strain sensors can be accomplished using a single SAW die, using standard SAW packages, with an input/output transducer located between two sets of reflectors (or transducers) on either end of the die. This embodiment is temperature compensated SAW strain sensor 1000 shown in FIGS. 8A-8B. In strain and temperature sensor 1000, an input/output (I/O) transducer 1002 is located on SAW substrate 1001. Transducer 1002 is in practice (not shown here) connected to an antenna along with matching circuitry as appropriate, or to a wired signal connection means to enable RF signals to activate the sensor and to transmit reflected sensor response signals. Sensor 1000 has at least two additional SAW elements formed on the SAW substrate on each of the left and right sides of the I/O transducer 1002. In FIGS. 8A-8B, elements 1003, 1004, 1005, and 1006 are all shown as transducers with interdigital electrodes. These transducers serve to reflect acoustic waves incident on them back towards the I/O transducer. For simplicity, unapodized bidirectional transducers with non-split electrodes are illustrated, but it would be obvious to one skilled in the art to utilize transducers with split fingers, or SPUDT transducers, or other SAW elements such as reflective gratings (for example, open circuited for strong reflections) to implement desired reflective acoustic wave responses, and to include apodization where that provides advantages. Dispersive or coded elements may also be utilized. The I/O transducer can be a broadband transducer, and the reflective elements may reflect over all or a portion of the frequency band of the signal launched by the I/O transducer.

Note that the distances between the I/O transducer 1002 and each reflector is indicated by the designation L #where #ranges (for this example) from 1 to 4. The SAW element distances from the I/O transducer L1, L2, L3, and L4 are defined by design. SAW substrate 1001 has a characteristic acoustic wave velocity that, taken together with the distance between SAW elements (transducers, reflectors, multistrip couplers, and the like) can be used to determine the time delay of responses from each SAW element. For any selected SAW substrate with known velocity, the time delay at which the peak of the acoustic response reflected from a reflector a distance L #from the I/O transducer will be approximately twice the distance L #divided by the SAW velocity. The factor of two in the delay comes from the fact that the acoustic wave traverses the propagation path twice, once on the way from the I/O transducer to the reflective element and again when the reflected wave propagates back from the reflector to the I/O transducer. In practice, since the velocity of the acoustic wave is different in regions of the die that are metalized and those that are free surface, it is necessary to take into account the contribution to delay of the free surface and transducer (or grating) regions based on their actual sizes to determine the signal delay precisely. Signal characteristics may also impact when the peak signal occurs. But in general, ignoring multiple transit response, the sensor 1000 produces four main acoustic responses, one from each of the four reflective SAW elements 1003, 1004, 1005, and 1006, that occur at four distinct delays, referred to as D1, D2, D3, and D4 respectively. The differential delay between the first and third response (D3-D1) and the second and fourth response (D4-D2) can be used to measure (strain and temperature) and temperature, respectively, with the die properly mounted.

In this differential delay line configuration, one side of the die is rigidly attached (or bonded) to a SAW package base (shown in FIG. 8B by adhesive 1009), while the other side of the die is left unattached from the SAW package base 1007. When the SAW package base 1007 is rigidly bonded to the sample for sensing mechanical strain, the rigidly bonded end of the SAW die experiences strain, while the unattached cantilevered end does not (provided the strain does not cause the package to mechanically exert a force on the unbonded end of the die). Both ends of the die experience thermal changes as the sample being tested changes temperature. Thermally conductive epoxies 1009 are generally used for die attach, to ensure good thermal contact between the SAW package base and the die. A thermally conductive layer 1008 (which may be metal or non-metal) can be applied to the bottom of the die to enhance heat transfer between the side of the die that is rigidly bonded and the unbonded side. In this configuration, the unbonded side of the die has at least two acoustic elements 1004 and 1006, which generally function as acoustic wave reflectors. One of these elements (1004) serves as the 'reference' reflector, with respect to which the delay of other reflective element 1006 is measured. This prevents the RF propagation delay from influencing the measurement—by making a differential delay measurement, accurate temperatures can be extracted without the sensor location (which influences the absolute delay of each acoustic response due to radio frequency (RF) propagation time to and from each sensor) relative to the interrogator influencing the measurement. The configurations 1000 shown also include a reference acoustic reflector 1003 on the strain-sensing side of the die, with respect to which the response from acoustic reflector 1005 is measured. Evaluation of the pair of differential delays— (D3−D1) influenced by strain and temperature and the (D4-D2) influenced only by temperature—allows for accurate temperature compensation of the strain response. Multiple methods can be used to 'subtract' the effect of temperature from the combined effect of temperature and strain. Acoustic peak delays can be determined using envelope detection, or for increased accuracy by tracking the phase of the RF carrier in the response. Cross correlation methods can be used to advantage to obtain delay differences precisely. This type of sensor can be used to measure both temperature and strain, with the strain measurement compensated for temperature by mathematical means. Note that to perform this compensation, one must first determine the temperature from the temperature side, and then calculate how much the strain side response (which has reflective SAW elements at different delays) should change due to the measured change in temperature. Once this effect has been determined, it can be subtracted from the combined strain and temperature response.

Errors in temperature determination will propagate to lower accuracy in the temperature compensated strain measurements. More than two reflective elements can be included on the temperature sensor portion of the die to improve accuracy of the temperature measurement. Another factor that may influence the accuracy of this sensor is any vibration of or force on the cantilevered portion of the SAW die. Any strain induced in this portion will be interpreted as temperature, thereby corrupting the strain temperature compensation. Also, conventional methods required characterizing the performance of the SAW sensor die over the full temperature range it will operate over in order to accurately predict the influence of temperature on the strain side. By contrast, the new improved sensor according to the present disclosure eliminates this requirement, as it is inherently temperature compensated over all temperatures without the need for such testing and calculations.

The goal of separating the temperature and strain measurements in the advanced SAW strain sensor package according to the present disclosure requires the use of two separate die. Previously, in a two-die approach each die has been designed to detect temperature or both temperature and strain using a differential delay produced by two or more reflectors on that die. Each die has its own reference reflector and at least one second reflector, the changing delay of which can be used to measure the elongation of the die due to temperature or temperature and strain. When the differential delays involved are relatively long (i.e. not in instances where closely spaced delays are used to produce notch-based sensor measurements), the strain resolution of this approach is limited by the size of the die; the longer the die the larger the differential delay that can be realized. Longer differential delays can provide increased strain (and temperature) sensitivity. Fairly long die are required to detect the small differential delay variations caused by microstrain (µε) level strains induced in the strain sensor die.

One way to avoid the need for very long die is the use of SAW differential delay lines with equal to significantly differing delays on the two die to produce notch-based sensors as described in U.S. Pat. No. 9,121,754 Surface Acoustic Wave Monitor for Deposition and Analysis of Ultra-Thin Films. Various embodiments of the present disclosure include implementation of this two-die notch measurement technique with the die housed in the split shim package to provide temperature compensated strain sensors that are both smaller and higher sensitivity than prior conventional SAW strain sensors. The enhanced sensitivity provided by the multiplicative nature of the notch implementation has not previously been applied to strain sensing.

Inherent Temperature Compensation with Four-Peak Responses

Figure 9:
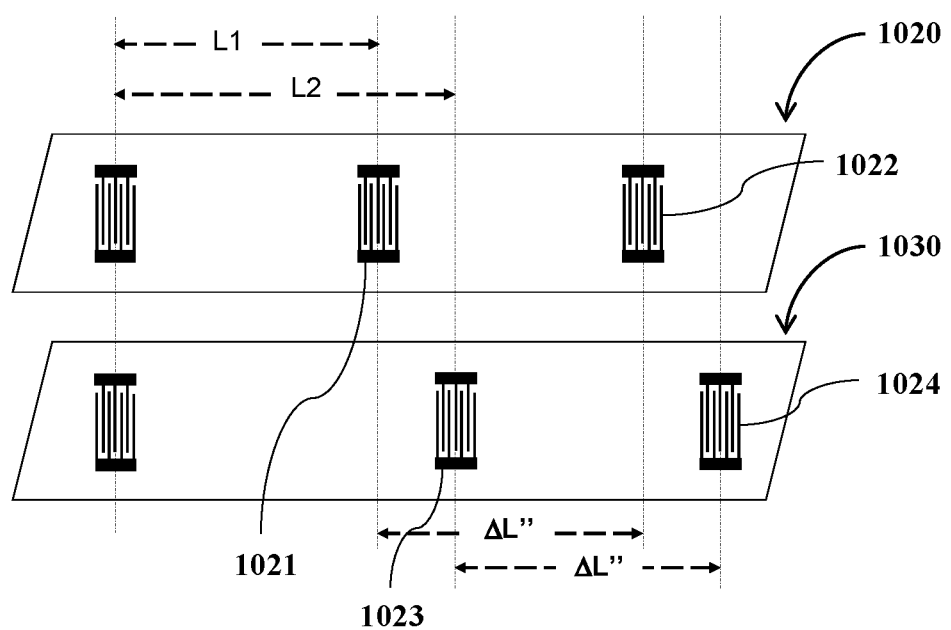
FIG. 9 shows a schematic representation of the two SAW die used in a two-die dual differential delay line approach to temperature compensated strain measurement, according to an embodiment of the present disclosure.

The package of the present disclosure provides the mechanical means by which the SAW temperature sensor die can be maintained at the same temperature as the strain sensor die, while being insulated from application of strain. The next goal is being able to determine strain without the impact of temperature—i.e. inherent temperature compensation. An improved approach that provides inherent temperature compensation is envisioned by the present disclosure. This approach, shown in FIG. 9, makes use of two separate die 1020 and 1030, each with one acoustic reference reflector element (1021 and 1023, respectively) to produce a reference response for that die, and each with at least one other acoustic reflector element (1022 and 1024, respectively), spaced from the reference reflector on that die to produce equal differential delays ΔL" on each die under reference conditions (equal temperature for the two die, and zero strain). The absolute delay to the reference reflectors (referred to herein as the "pedestal delay") on the two die may be the same, or may be significantly different. The pedestal delays correspond to the round-trip acoustic delay time for the surface wave to travel the distances L1 and L2 in FIG. 9, with appropriate wave velocities in grating and free surface regions taken into account. If the pedestal delays are equal, the two devices will have reflected measurement response that move together with temperature. Application of strain will cause the differential delay of the strain sensor response to differ from that of the temperature response. The difference in these two responses can produce a notched response that is characteristic of the measured strain (without the influence of temperature). In another exemplary embodiment, illustrated in FIG. 9 where L2 is larger than L1, the pedestal delay of the temperature responses differs from the pedestal delay of the strain responses, resulting in individually identifiable time domain response peaks. As both the strain and temperature sensor die differential delays (which are equal) will be impacted identically by temperature, the different between these responses can be used to extract the strain response, free of the influence of temperature. Thus, this device produces an inherently temperature compensated measure of strain.

This approach, which may have many embodiments, can be extended so the temperature measurement die provides acoustic responses that occur at two or more different delays, forming therebetween at least one differential delay, from which the device temperature can be determined. The strain measurement die in this approach produces two or more acoustic responses, which taken together with the responses from the temperature measurement die, produce therebetween responses from which the combined effect of temperature and strain can be determined. Making the differential delays produced on the temperature side and the strain side equal under reference conditions (such as at a reference temperature when exposed to zero strain) can result in an inherent temperature compensation. In this embodiment, changes in temperature and strain together will cause a change in differential delay of the strain measurement die response that differs from the change in differential delay of the temperature measurement die response that is caused by temperature variation. The differential measured between the differential delays on the temperature die and the strain die provides a measurement of strain without the influence of temperature. Alternatively, having different differential delays on the temperature die and the strain die provides individually identifiable responses that can, taken together, be used to determine both temperature and strain.

Three-Peak Responses

Figure 10:
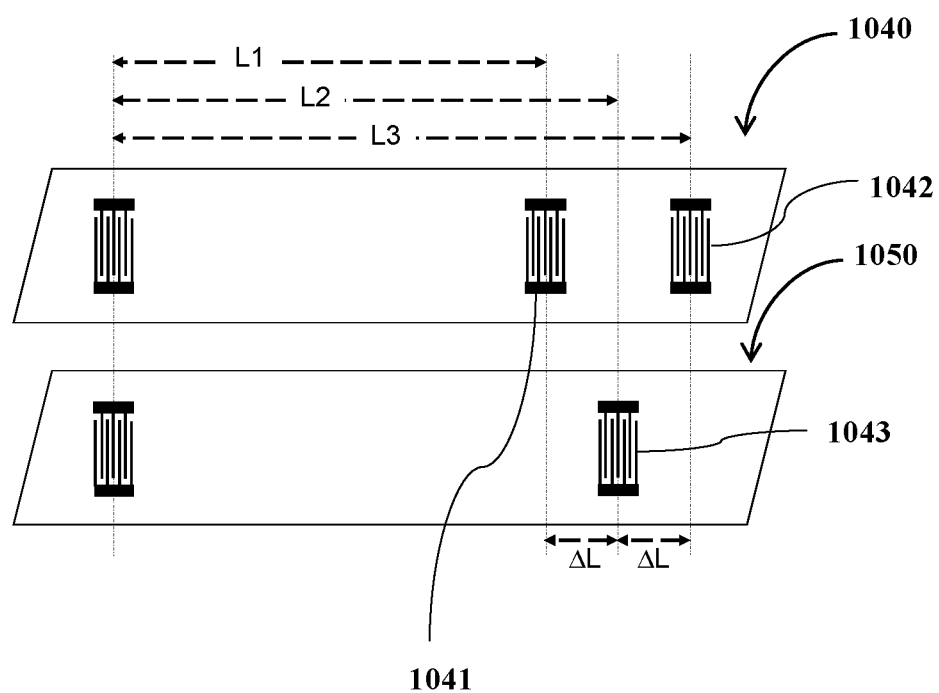
FIG. 10 shows a schematic representation of the layout of two SAW die used in a the improved inherently temperature compensated strain measurement approach, according to an embodiment of the present disclosure.

Another novel approach to producing temperature compensated SAW strain sensors with enhanced strain sensitivity while reducing die size (compared to conventional approaches) is provided by the present disclosure. This approach still makes use of two separate die, but only one acoustic reference response, on the temperature sensing die, is used. In this approach, which may have many embodiments, the temperature measurement die will provide acoustic responses that occur at two or more different delays, forming therebetween at least one differential delay, from which the device temperature can be determined. The strain measurement die in this approach produces at least one acoustic response, which taken together with the reference response and one second acoustic response from the temperature measurement die, produce therebetween at least two differential delays from which the combined effect of temperature and strain can be determined. Making the differential delays produced between the temperature side acoustic responses and the strain side acoustic response have a precise relationship under reference conditions (such as at a reference temperature when exposed to zero strain) can result in an inherent temperature compensation. FIG. 10 shows the SAW die layout for one exemplary embodiment of a SAW strain sensor with inherent temperature compensation, according to the present disclosure. In this embodiment, the temperature compensated SAW strain sensor utilizes two SAW die, a temperature die 1040 and a strain die 1050. In this embodiment, reflective elements are shown as transducers. Reflective element 1041 and 1042 are positioned on the temperature die 1040, at two distances from the input/output transducer such that the center-to-center distance between 1041 and 1042 is 2ΔL. Reflective element 1043 is positioned on the strain sensor die 1050, at a distance from the I/O transducer on that die such that the differential delay between the reflections from reflector 1043 and reflector 1041 (called T12 since it is between the first and second reflectors) is equal to the differential delay between the reflections from reflector 1042 and reflector 1043 (called T23 since it is between the second and the third reflectors) with both die at the same temperature and under zero strain conditions. If the I/O transducers on both die are aligned, this corresponds to reflective element 1043 being a distance ΔL from both reflective element 1041 and reflective element 1042. This corresponds to L3=L2+ΔL and L2=L1+ΔL. Under zero strain conditions, T12=T23 at any temperature. Both die are maintained at the same temperature by being mounted on the thermally conductive split-shim base of the present disclosure. In operation, as temperature increases, the absolute delays of responses reflected from reflectors 1041, 1042, and 1043 will all increase. Since the amount the acoustic wave delay increases per degree increase in temperature is proportional to the delay, the delay of reflector 1041 will increase less than the delay of reflector 1043, which in turn increases less than the delay of reflector 1042. Due the near linearity of the temperature response of delay in selected SAW substrates, the differential delays T12 and T23 will both increase, but will remain equal. When the strain measurement die 1050 is strained, the delay of the reflector 1043 response will move, causing T12 and T23 to differ in a complementary manner (if T12 increases, T23 decreases, and vice versa). How much T12 and T23 differ from one another is a direct measure of strain, independent of temperature, that is twice as large as the change in delay of the reflection from reflector 1043 caused by the strain. Since this difference is independent of temperature, an inherently temperature compensated strain sensor has been realized.

An inherent benefit of the embodiments provided by the present disclosure is the fact that they automatically measure strain with higher resolution than prior differential delay line devices for a given die size. Prior approaches included a strain reference reflector on the same die which was subjected to mechanical strain. The delay of the reference response also changes with changes in temperature. The differential delay between the reference and the second reflector on the strain die would be limited based on the die size. If multiple sensors are designed to work together utilizing time diversity, the number of sensors required to operate together will impact the maximum die size required. With this new approach according to the present disclosure, the reference response used for strain, which is now on the temperature die 1040, will not move in response to mechanical strain as this temperature die is mechanically isolated by the split-shim base from the mechanical strain in the material being tested. This allows use of the strain response of the entire strain die surface between the I/O transducer and the reflector 1043, rather than only the portion of the die between two reflectors. The longer acoustic measurement path enhances device sensitivity. Also, the dual-differential nature of the measurement increases the strain response sensitivity by an additional factor of two (doubling the response sensitivity relative that would be obtained from a single differential delay strain measurement). FIG. 11 provides a table illustrating the improvement in sensitivity achieved with the three-peak inherently temperature compensated SAW strain sensor according to the present disclosure, over the four-peak approach of FIG. 9 with a dedicated reference on the strain die, for a given die size. The number of sensors that can be designed to operate together using a simple time diversity approach (at a given frequency) is shown in the first column of the table in FIG. 11.

Another inherent benefit of the various embodiments according to the present disclosure is the need for fewer total acoustic responses to achieve a specific measurement result. For systems that utilize time diversity as one component of sensor recognition, this means that more sensors can be built that can operate simultaneously together (without interfering with one another) in the field of view of a single reader. For example, if a given system has 12 time slots available, and each sensor needs four acoustic responses (two each for temperature and for strain—one reference and one for measurement), three sensors can be constructed. Use of the temperature reference as an acoustic reference for both temperature and strain according to the present disclosure reduces the number of responses needed for each sensor to three, meaning that four sensors can be built, rather than the prior three sensors. This benefit applies to larger sets of sensors as well.

Figure 12:
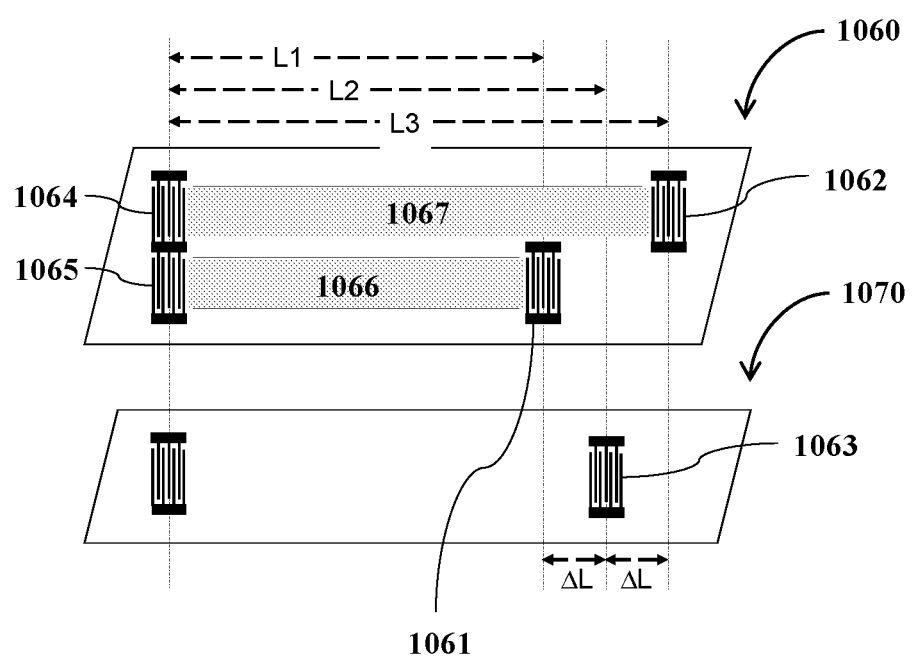
FIG. 12 shows two exemplary SAW die as used in the disclosed strain measurement approach where more than one acoustic propagation path is utilized on at least one die, according to the present disclosure.

FIG. 12 shows another exemplary embodiment of a pair of SAW die for use in a temperature compensated SAW sensor according to the present disclosure. This embodiment includes temperature sensing die 1060 and strain sensing die 1070. Temperature sensor die 1060 in this embodiment includes two input/output transducers 1064 and 1065 electrically connected in parallel and positioned in two parallel acoustic wave propagation tracks, indicated by the shaded areas 1066 and 1067 in FIG. 12. An acoustic wave propagation track is, in general, defined as the portion of the SAW substrate between two or more acoustic wave elements along which the acoustic wave propagates when launched from a transducer. The wave propagation track is normally oriented perpendicular to the electrodes in the launching interdigital transducer. The two-track embodiment of FIG. 12 has the benefit of both reflected responses (from 1062 and 1061) on the temperature die 1060 should be approximately equal in amplitude. In FIG. 10, the single acoustic track embodiment for temperature die 1040 may result in different response amplitudes for reflections from 1041 and 1042, since any acoustic wave energy reflected by 1041 does not propagate on to or reflect from 1042, meaning that if the two reflectors have equal efficiency, the reflection from 1042 will be lower. The two-track embodiment alleviates this issue, but at the expense of power division loss between the two I/O transducers 1064 and 1065, which reduces both acoustic responses from the temperature die by approximately 6 dB. In the embodiment of FIG. 12, as in that of FIG. 10, reflective elements 1061 and 1062 are positioned on the temperature die 1060, at two distances from the input/output transducer such that the center-to-center distance between 1061 and 1062 is 2ΔL (where ΔL can be selected relatively arbitrarily). Reflective element 1063 is positioned on the strain sensor die 1070, at a distance from the I/O transducer on that die such that the differential delay between the reflections from reflector 1063 and reflector 1061 is equal to the differential delay between the reflections from reflector 1062 and reflector 1063.

Figure 13:
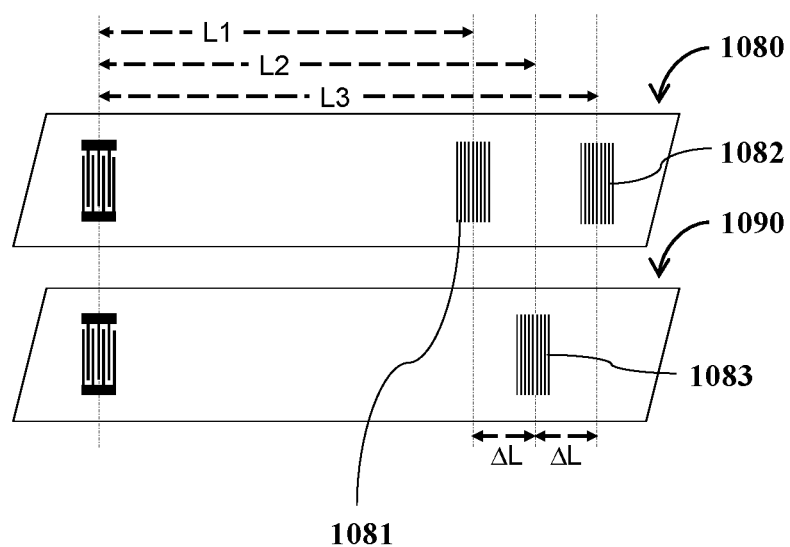
FIG. 13 shows an exemplary representation of the layout of two SAW die used in the disclosed strain measurement approach where reflective acoustic wave elements are shown as gratings rather than as transducers, according to an embodiment of the present disclosure.

FIG. 13 shows another exemplary embodiment of the SAW die of an inherently temperature compensated SAW strain sensor according to the present disclosure. This embodiment is similar to that shown in FIG. 10, but with open circuited gratings 1081, 1082, and 1083 as the reflective elements (rather than transducers 1041, 1042, and 1043 of FIG. 10). In this embodiment, the temperature compensated SAW strain sensor again utilizes two SAW die, a temperature die 1080 and a strain die 1090. Reflective element 1081 and 1082 are positioned on the temperature die 1080, at two distances from the input/output transducer such that the center-to-center distance between 1081 and 1082 is 2ΔL. Note that ΔL is a distance that can be defined fairly arbitrarily, although certain spacings of reflective elements will impact the range over which the system is able to determine temperature. Reflective element 1083 is positioned on the strain sensor die 1090, at a distance from the I/O transducer on that die such that the differential delay between the reflections from reflector 1083 and reflector 1081 (called T12 since it is between the first and second reflectors) is equal to the differential delay between the reflections from reflector 1082 and reflector 1083 (called T23 since it is between the second and the third reflectors) with both die at the same temperature and under zero strain conditions. If the I/O transducers on both die are aligned, this corresponds to reflective element 1083 being a distance ΔL from both reflective element 1081 and reflective element 1082. This corresponds to L3=L2+ΔL and L2=L1+ΔL in FIG. 13. Under zero strain conditions, T12=T23 at any temperature. Both die are maintained at the same temperature by being mounted on the thermally conductive split-shim base of the present disclosure. In operation, as temperature increases, the absolute delays of responses reflected from reflectors 1081, 1082, and 1083 will all increase. Since the amount the acoustic wave delay increases per degree increase in temperature is proportional to the delay, the delay of reflector 1081 will increase less than the delay of reflector 1083, which in turn increases less than the delay of reflector 1082. Due the near linearity of the temperature response of delay in selected SAW substrates, the differential delays T12 and T23 will both increase, but will remain equal. When the strain measurement die 1090 is strained, the delay of the reflector 1083 response will move, causing T12 and T23 to differ in a complementary manner (if T12 increases, T23 decreases, and vice versa). How much T12 and T23 differ from one another is a direct measure of strain, independent of temperature, that is twice as large as the change in delay of the reflection from reflector 1083 caused by the strain.

Figure 14:
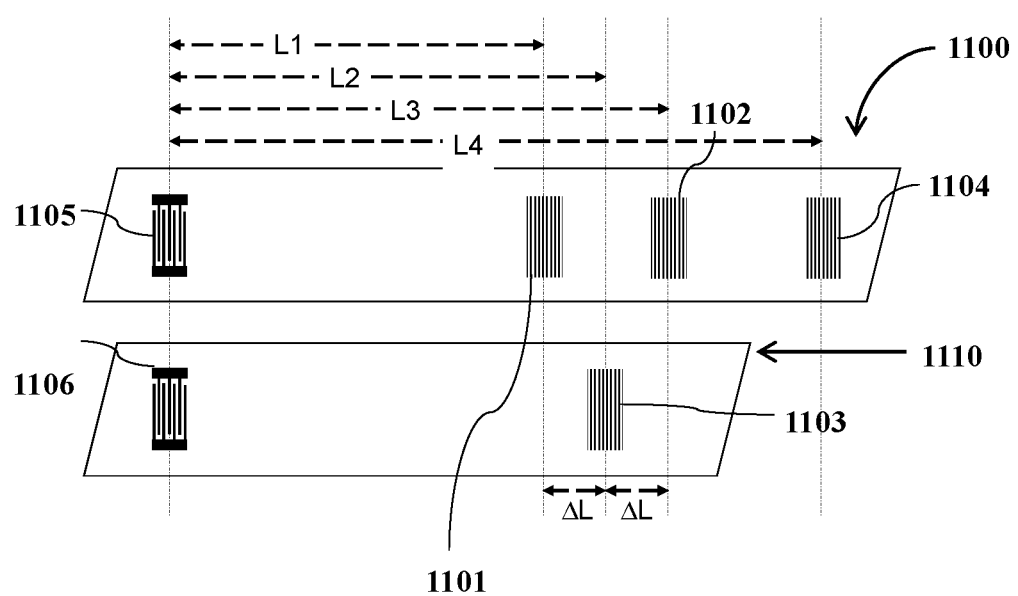
FIG. 14 shows an embodiment of two SAW die used in the improved inherently temperature compensated strain measurement approach where an additional acoustic response is provided from the temperature die for enhanced temperature measurement, according to the present disclosure.

One drawback of the temperature compensated strain sensor using the embodiments of FIG. 10 or FIG. 13 is the inability to extract high precision temperature measurements over wide temperature ranges, in addition to strain measurements. In these embodiments, the differential delay between the two reflective elements on the temperature die can be used to determine temperature, over a limited temperature range. Improved temperature measurements can be made by including a third reflective element on the temperature die. FIG. 14 shows another exemplary embodiment of an inherently temperature compensated SAW strain sensor with improved temperature measurement capabilities according to the present disclosure. In this embodiment, SAW temperature measurement die 1100 includes an I/O transducer 1105 and three reflective elements 1101, 1102, and 1104, while SAW strain sensor die 1110 includes an I/O transducer 1106 and at least one reflective element 1103. The relative positions of 1101, 1102, and 1103 are as described for the embodiments of FIGS. 10 and 13, and inherently temperature compensated strain measurements are produced from the three acoustic responses from these reflective elements.

Simultaneously, the three acoustic responses from reflective elements 1101, 1102, and 1104 can be used to determine temperature precisely over a defined (but fairly wide) range.

Figure 15:
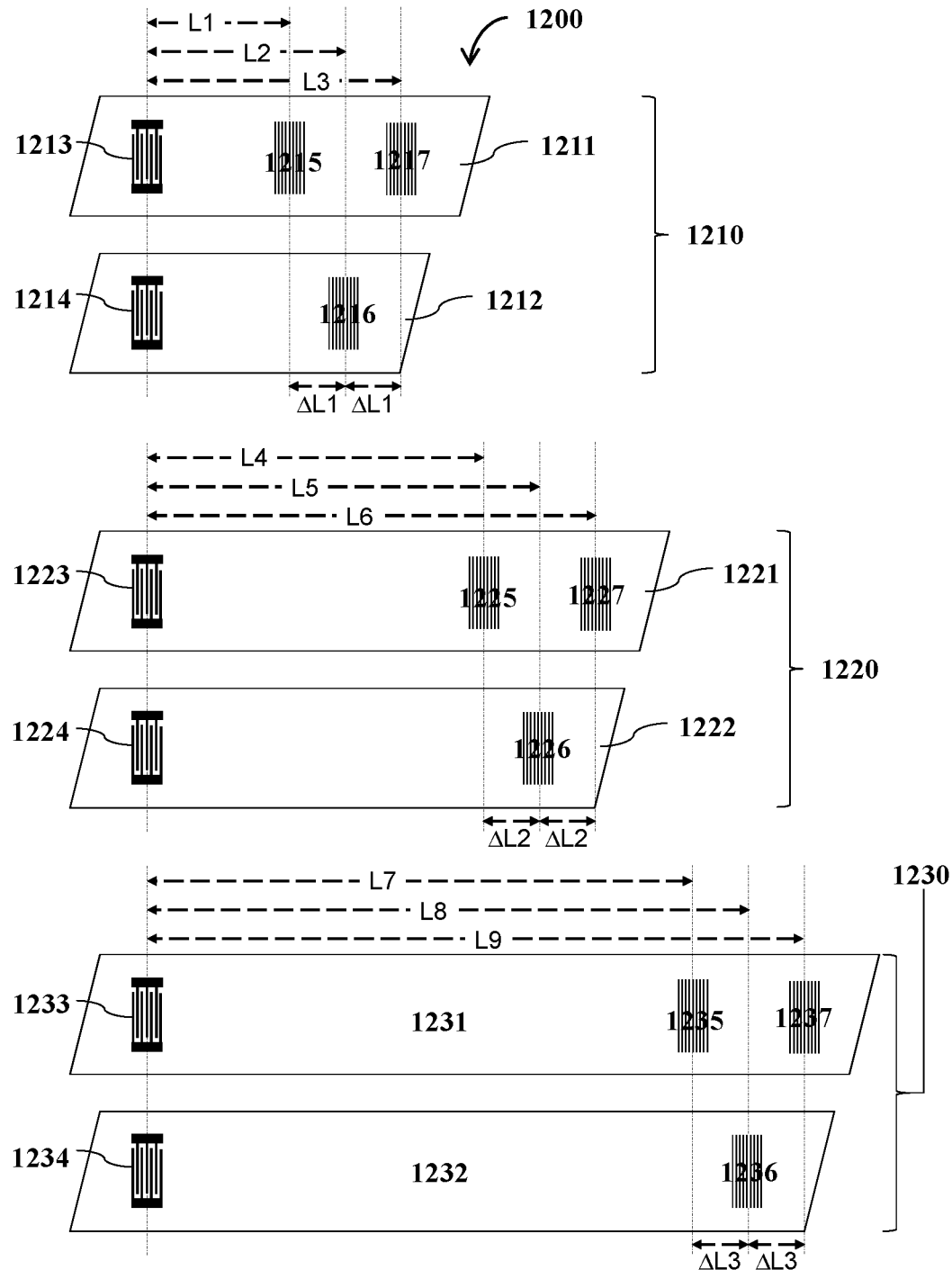
FIG. 15 shows a set of three pairs of SAW die providing inherently temperature compensated strain measurements where the acoustic responses from each sensor are grouped in time (non-interleaved), according to an embodiment of the present disclosure.

The present disclosure further contemplates a set of inherently temperature compensated SAW strain sensors, that can all work together within the field of view of a single reader (or interrogator, or data aggregator), without interfering with one another. FIG. 15 is illustrative of one exemplary embodiment of a set 1200 of 3 inherently temperature compensated SAW strain sensor die pairs (1210, 1220, and 1230), each of which consists of a temperature die (1211, 1221, and 1231 respectively) and a strain die (1212, 1222, and 1232, respectively). Only three pairs of die are included in this set by way of example but larger sets can be constructed as other embodiments of the present disclosure. To produce temperature compensated strain sensors, each pair of die is mounted onto a split-shim package base according to the present disclosure, or on another carrier that keeps the two die of the pair in thermal equilibrium while exposing the strain die (for example 1212) to strain while isolating the temperature die (for example 1211) from exposure to strain. In each pair, the temperature die (for example 1231) includes an I/O transducer 1233, and at least two reflective elements 1235 and 1237 that are positioned on the temperature die 1231 at two distances from the input/output transducer 1233 such that the center-to-center distance between 1235 and 1237 is 2ΔL3. At least one reflective element 1236 is positioned on the strain sensor die 1232, at a distance from the I/O transducer 1234 on that die such that the differential delay between the reflections from reflector 1235 and reflector 1236 (called T12 since it is between the first and second reflectors) is equal to the differential delay between the reflections from reflector 1236 and reflector 1237 (called T23 since it is between the second and the third reflectors) with both die at the same temperature and under zero strain conditions. If the I/O transducers on both die are aligned, this corresponds to reflective element 1236 being a distance ΔL3 from both reflective element 1235 and reflective element 1237. This corresponds to L8=L7+ΔL3 and L9=L8+ΔL3 in FIG. 15. Die pair 1210 and 1220 have I/O transducers and reflective elements similarly positioned, so that in die pair 1210, L2=L1+ΔL1 and L3=L2+ΔL1 and in die pair 1220, L5=L4+ΔL2 and L6=L5+ΔL2. Note that in this set of sensors, the distances ΔL1, ΔL2, and ΔL3 may be the same or different.

As shown in FIG. 15, the sets of reflective elements may be grouped such that each group of at least three acoustic reflections from one die pair (say 1210) occurs within a defined time range after the interrogation signal has been received by the I/O transducers 1213 and 1214, and the group of at least three acoustic reflections from the next die pair (1220) occurs within a defined time range after the interrogation signal has been received by the I/O transducers 1223 and 1224 that is later in time, and the group of at least three acoustic reflections from the next die pair (1230) occurs within a defined time range after the interrogation signal has been received by the I/O transducers 1233 and 1234 that is still later in time. The time delay at which each acoustic response signal occurs depends on the center to center transducer to reflector separation distance, indicated on FIG. 15 by L1 through L9 for the first through $9^{th}$ reflection respectively, and on the acoustic velocity in the substrate and the portion of the die that is free surface, under metal (metalized), or under a metal grating. This timing of the reflective elements among a set of die is referred to herein as non-interleaved reflector positioning, since each set of acoustic responses from a pair of die occurs in a time period that is distinct from the time periods in which the sets of responses from other pairs of die occur. This configuration has certain advantages when time diversity is used to implement sets of SAW sensors, since the at least three reflected acoustic responses from each die pair will always be at the same temperature when used in the present disclosure. This means that these responses can be closely packed in time, since they will move in a common manner in response to changes in temperature. Thus for a set of sensors to operate together without interfering, one only needs to add enough spacing between the timing of the groups of reflections to take into account movement in time of the whole group in response to changes in temperature over the desired operating range. This ensures that even if individual sensors in the group are at opposite temperature extremes (one at the upper end and one at the lower end of the operating temperature range), the acoustic responses they produce will not overlap in time. Use of chirp or other spread spectrum interrogation signals can result in responses that overlap in time, but that can be separated through pulse compression, signal correlation, or similar means.

Another embodiment of the present disclosure (not shown in the figures) is similar to that shown in FIGS. 10, 12, 13, 14, and 15, but utilizes reflective elements that are long enough in time that the individual reflected signals overlap in time with one another, rather than having each reflected response separate in time as indicated by the configuration of FIGS. 10, 12, 13, 14, and 15. Use of chirp (or other spread spectrum or dispersive) or coded transducers and/or reflectors may enhance sensor signal levels for improved performance, with appropriate signal processing.

Figure 16:
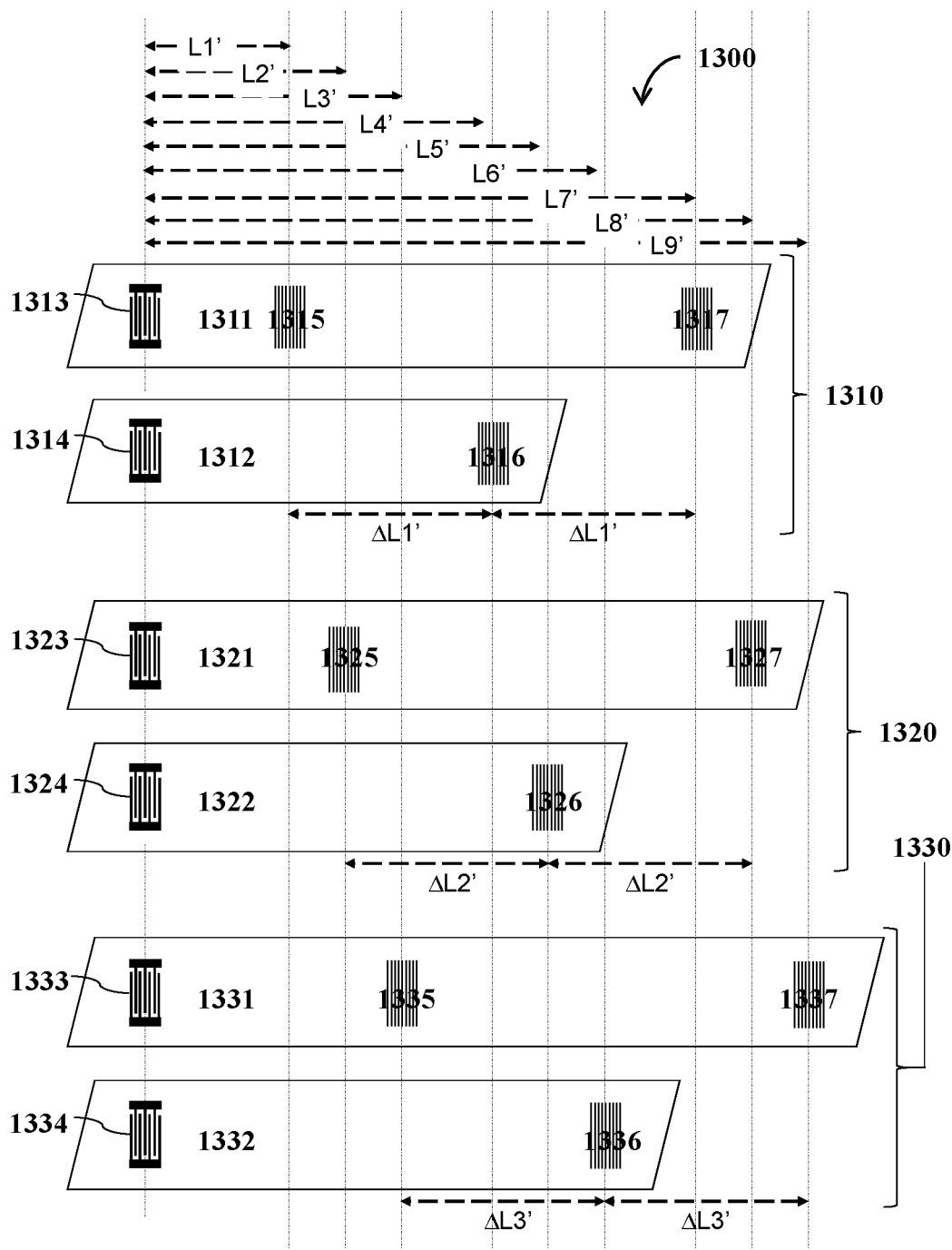
FIG. 16 shows a set of three pairs of SAW die providing inherently temperature compensated strain measurements where the acoustic responses from each sensor are interleaved in time, according to an embodiment of the present disclosure.

Yet another aspect of the present disclosure is a set of inherently temperature compensated SAW strain sensors 1300, that can all work together within the field of view of a single reader (or interrogator, or data aggregator), without interfering with one another as illustrated in FIG. 16. In FIG. 16, one embodiment of a set 1300 of 3 inherently temperature compensated SAW strain sensor die pairs (1310, 1320, and 1330), each of which consists of a temperature die (1311, 1321, and 1331 respectively) and a strain die (1312, 1322, and 1332, respectively). Only three pairs of die are included in this set by way of example but larger sets can be constructed as other embodiments of the present disclosure. To produce temperature compensated strain sensors, each pair of die is mounted onto a split-shim package base according to the present disclosure, or on another carrier that keeps the two die of the pair in thermal equilibrium while exposing the strain die (for example 1322) to strain while isolating the temperature die (for example 1321) from exposure to strain. In each pair, the temperature die (for example 1311) includes an I/O transducer 1313, and at least two reflective elements 1315 and 1317 that are positioned on the temperature die 1311 at two distances from the input/output transducer 1313 such that the center-to-center distance between 1315 and 1317 is 2ΔL1'. At least one reflective element 1316 is positioned on the strain sensor die 1312, at a distance from the I/O transducer 1314 on that die such that the differential delay between the acoustic signals reflected from reflector 1315 and reflector 1316 is equal to the differential delay between the acoustic signals reflected from reflector 1316 and reflector 1317 with both die at the same temperature and under zero strain conditions. If the I/O transducers on both die are aligned, this corresponds to reflective element 1316 being a distance ΔL1 from both reflective element 1315 and reflective element 1317. This corresponds to L4=L1+ΔL1 and L7=L4+ΔL1 in FIG. 16. Die pair 1320 and 1330 have I/O transducers and reflective elements similarly positioned, so that in die pair 1320, L5=L2+ΔL2 and L8=L5+ΔL2, and in die pair 1330, L6=L3+ΔL3 and L9=L6+ΔL3. Note that in this set of sensors, the distances ΔL1, ΔL2, and ΔL3 may be the same or different. In this embodiment, the acoustic responses reflected from the reflective elements are interleaved in the time domain, so that the first acoustic reflections from all temperature sensor die occur before the second reflection from any of the strain sensor die, and the second acoustic reflections from all strain sensor die occur before the third reflection from any of the temperature sensor die.

While the embodiments of FIGS. 15 and 16 are illustrative, it would be clear to one skilled in the art that any combination of acoustic responses that are interleaved and non-interleaved in the time domain could be used to advantage and would be within the scope of the present disclosure.

It will be understood by one skilled in the art that the improvements and isolation of strain away from the temperature sensing element provided by the split shim base concept could be used with any pair of sensors that are sensitive to both temperature and strain, to enable temperature compensation of other (non-SAW) strain sensors. As a specific example, conventional foil or semiconductor strain gauges could be used in place of the two SAW die to provide for temperature compensation of conventional gauges.

Additionally, the present disclosure contemplates production of temperature compensated acoustic wave sensors or sensor-tags configured to measure numerous environmental properties beyond mechanical strain, including, as non-limiting examples, (1) measurement of physical properties of the environment such as strain, pressure, weight, force, torque, and displacement; (2) chemical properties of the environment such as detection, identification, and quantitation of chemicals in gaseous, aerosol or liquid form, and (3) biological properties of the environment, such as detection, identification, and quantitation of biomolecules, bacteria, viruses, biopathogens, etc.

One skilled in the art will also recognize that there are a wide range of acoustic wave device embodiments that can be used to implement temperature compensated sensors or sensor-tag devices (other than just strain sensors) using the three peak acoustic response on two die approach according to the present disclosure. Temperature compensation can be accomplished using this approach for any SAW measurement in which one die is exposed to changes in temperature and the other SAW die is exposed to changes in both temperature and another measurand (or measurands), provided that the temperature sensing die: is at the same temperature as the die making other measurements; has a common change in behavior due to changes in temperature as the other measurement die; and is isolated from the effects of changes in the non-temperature measurand(s). By way of example, a chemical vapor sensor incorporating a chemically selective film coating on the surface of an acoustic wave device will have a change in wave velocity as a function of temperature that is different than that of a 'bare' or uncoated SAW die. To achieve temperature compensation for such a system using the three peak approach according to the present disclosure, one would need to coat both the temperature and the chemical sensing die with the same coating, over the same acoustic propagation path length. The temperature response of the two die would then be the same. The temperature measurement die would need to be kept in thermal equilibrium with the chemical sensor die, but it would need to be hermetically sealed to keep it isolated from exposure to chemical measurands. Measurands other than strain may require alternative packaging techniques to achieve the needed isolation.

One skilled in the art will also recognize that loading of one or more reflectors with impedance varying elements to produce sensor-tags may be beneficial and may expand the range of parameters that can be measured in a temperature compensated manner within the scope of the present disclosure. As varying the load impedance of an acoustic reflector may alter the amplitude of the reflected response from that reflector, while leaving the delay unchanged (in certain circumstances), it may be possible to utilize individual reflective elements in amplitude modulated measurement of parameters sensed by external impedance varying elements that are electrically connected to the reflector (or reflective transducer), while using the delay of the acoustic response from these reflectors in delay-based measurements of temperature, strain, or other parameters.

All of these devices can, as appropriate, be implemented in single acoustic track formats, or in multiple acoustic track formats. One or multiple acoustic paths can be used to provide reference signal(s), and one or multiple acoustic tracks can be used to provide measurements for target parameters. These acoustic tracks and SAW die can all be at different frequencies, or two or more acoustic tracks or die can be at the same frequency, and can be used to form combined signals that provide added insight into the measured parameters. Coding (including direct sequence spread spectrum (DSSS), orthogonal frequency coding (OFC), pseudo-noise (PN), or any of a wide range of other coding techniques) can be incorporated into the sensors according to the present disclosure, and can be used alone, with different delays, or in combinations of frequencies and/or delays, or with dispersive structures (including chirps), to provide device embodiments advantageous for use in sets to measure particular properties, alone or in combination.

The transducers and/or reflectors can be non-dispersive, or can be tapered, slanted, stepped tapered, apodized, withdrawal weighted, EWC, UDT, SPUDT, dispersive, and/or waveguide structures. All of these techniques could also be used to implement device embodiments using dispersive and harmonic techniques. One specific embodiment of interest would utilize a chirped transducer, to take advantage of the chirp compression processing gain in the system.

Also, one skilled in the art will recognize that these devices can be implemented on various substrate materials, and can utilize various acoustic wave propagation modes, in order to achieve performance required for specific applications. Substrate materials with nearly linear changes in velocity with temperature will result in sensors with better temperature compensation than those with nonlinear changes in velocity with temperature, for the temperature range of interest.

Any of a wide range of known techniques can be implemented to obtain sets of functionally non-interacting sensors that can operate together simultaneously in the field of view of a single reader without inter-sensor interference. Frequency diversity, code diversity, time diversity, and other known techniques can be combined with the embodiments of the present disclosure to achieve sets of devices with desirable properties. Any of these techniques could be utilized in the aforementioned device embodiments to increase the number of sensors that can work together in a system. Devices utilizing such structures could also be useful for RFID tag and sensor-tag applications, where identification of individual devices is desired. In addition, combinations of these techniques may be advantageous in certain circumstances. The present disclosure can be wirelessly interrogated using any of a wide range of known SAW interrogation techniques and systems.

Although the present disclosure uses the term surface acoustic wave device, which typically includes a Rayleigh wave, one skilled in the art would readily recognize that many other surface-launched acoustic wave modes and other acoustic wave devices can be used according to the various embodiments discussed herein.

While the subject matter of this disclosure has been described and shown in considerable detail with reference to certain illustrative embodiments, including various combinations and sub-combinations of features, those skilled in the art will readily appreciate other embodiments and variations and modifications thereof as encompassed within the scope of the present disclosure. Moreover, the descriptions of such embodiments, combinations, and sub-combinations is not intended to convey that the claimed subject matter requires features or combinations of features other than those expressly recited in the claims. Accordingly, the scope of this disclosure is intended to include all modifications and variations encompassed within the spirit and scope of the following appended claims.

What is claimed is:

1. A temperature compensated acoustic wave sensor apparatus, comprising:
   a first acoustic wave device die that is responsive to temperature;
   at least one second acoustic wave device die that is responsive to temperature and is responsive to at least one other environmental property;
   wherein each of said acoustic wave device die comprises a piezoelectric substrate and at least one first surface acoustic wave element comprising a first transducer formed on said piezoelectric substrate, wherein said first transducer comprises electrode structures capable of generating and receiving acoustic waves along a direction of acoustic wave propagation;
   a package configured to house and provide mechanical protection for the first and at least one second acoustic wave device die and to provide electrical interconnection to said at least one first transducer on each of said die, wherein said package is thermally conductive and maintains both die at the same temperature, wherein said package isolates said first acoustic wave device die from being influenced by said at least one other environmental property; and wherein said package exposes said at least one second acoustic wave device die to be influenced by said at least one other environmental property;
   wherein said first acoustic wave device die further comprises:
      at least one second surface acoustic wave element formed on said piezoelectric substrate and spaced apart from said first transducer along the direction of acoustic wave propagation at a first distance to provide a first acoustic delay, said at least one second surface acoustic wave element comprising electrode structures capable of interacting with acoustic waves at frequencies that correspond to the frequencies generated by said at least one first transducer;
      at least one third surface acoustic wave element formed on said piezoelectric substrate and spaced apart from said first transducer along the direction of acoustic wave propagation at a second distance to provide a third acoustic delay, said at least one third surface acoustic wave element comprising electrode structures capable of interacting with acoustic waves at frequencies that correspond to the frequencies generated by said at least one first transducer;
   wherein said at least one second acoustic wave device die further comprises:
      at least one second surface acoustic wave element formed on said piezoelectric substrate and spaced apart from said first transducer along the direction of acoustic wave propagation at a third distance to create a second acoustic delay, said at least one second surface acoustic wave element comprising electrode structures capable of interacting with acoustic waves at frequencies that correspond to the frequencies generated by said at least one first transducer;
   wherein a first differential delay is equal to the difference between said second acoustic delay and said first acoustic delay; and
   wherein a second differential delay is equal to the difference between said third acoustic delay and said second acoustic delay; and
   wherein said first differential delay and said second differential delay are equal when said first and said at least one second acoustic wave device die are at the same temperature and said at least one second acoustic wave device die is isolated from other environmental effects that influence its response;
   wherein the difference between said first differential delay and said second differential delay provides a measurement of said at least one other environmental property, wherein the measurement is independent of temperature.

2. The temperature compensated acoustic wave sensor apparatus, according to claim 1,
   wherein a third differential delay is equal to the difference between said third acoustic delay and said first acoustic delay; and
   wherein said third differential delay is indicative of the temperature of the sensor apparatus over a selected temperature range.

3. The temperature compensated acoustic wave sensor apparatus according to claim 1, wherein said first acoustic wave device die further comprises:
   at least one fourth surface acoustic wave element formed on said piezoelectric substrate of the first acoustic wave device and spaced apart from said first transducer along the direction of acoustic wave propagation at a fourth distance to create a fourth acoustic delay, said at least one fourth surface acoustic wave element comprising electrode structures capable of interacting with acoustic waves at frequencies that correspond to the frequencies generated by said at least one first transducer;
   wherein a third differential delay is equal to the difference between said third acoustic delay and said first acoustic delay; and
   wherein a fourth differential delay is equal to the difference between said fourth acoustic delay and said third acoustic delay; and
   wherein a fifth differential delay is equal to the difference between said fourth acoustic delay and said first acoustic delay; and
   wherein said third, fourth, and fifth differential delays taken together are capable of being used to determine the temperature of the sensor apparatus.

4. A set of individually identifiable, inherently temperature compensated acoustic wave sensor apparatuses comprising two or more sensor apparatuses according to claim 1, wherein each sensor apparatus in said set produces at least three acoustic responses that occur at separate times within a defined time range for that sensor apparatus; and wherein the acoustic responses from each sensor apparatus occur within a defined time range that does not contain any acoustic responses from other sensor apparatuses in the set.

5. A set of individually identifiable, inherently temperature compensated acoustic wave sensor apparatuses comprising two or more sensor apparatuses according to claim 1, wherein each sensor apparatus in said set produces at least three acoustic responses that occur at separate times; and wherein individual acoustic responses from the sensor apparatuses are interleaved in time, such that any time range that encompasses all of the acoustic responses from one sensor apparatus necessarily also includes at least one acoustic response from a different sensor apparatus in the set.

6. The temperature compensated acoustic wave sensor apparatus according to claim 1, wherein the at least one other environmental property comprises strain; and wherein said package further includes a package base that isolates said first acoustic wave device die from being influenced by strain and exposes said at least one second acoustic wave device die to be influenced by strain;

wherein said package base comprises at least two sides, a temperature side and a strain side, each with portions for mounting acoustic wave device die;

wherein said sides of the package base are mechanically separated from one another between the die mounting portions of the base;

further comprising a connected end that joins the temperature side and the strain side at one end of the package base;

further comprising mounting portions at both ends of the strain side, for attaching the strain measurement apparatus to an object to be measured;

wherein said first acoustic wave device die is mounted to said temperature side of said package base and at least one second acoustic wave device die is mounted to said strain side of said package base.

7. The temperature compensated acoustic wave sensor apparatus according to claim 1, wherein one or more of said surface acoustic wave elements include dispersive or coded structures.

8. The temperature compensated acoustic wave sensor apparatus according to claim 1, said first acoustic wave device die or said at least one second acoustic wave device die further comprising SAW elements that are electrically connected to variable impedance elements for measuring at least one property of an environment of the apparatus.

9. The temperature compensated acoustic wave sensor apparatus according to claim 1, wherein changes in frequency, amplitude, delay, phase, or any combination of these are used as measurands.

10. A package base for use in a temperature compensated sensor apparatus for measuring strain in an object the sensor apparatus is mounted on, wherein said sensor apparatus includes one first sensor device responsive to temperature and at least one second sensor device responsive to both temperature and strain;

wherein said package base is comprised of thermally conductive material to maintain said first and second sensor devices at the same temperature;

wherein said package base comprises at least two sides, a temperature side and a strain side, each with portions for mounting sensor devices;

wherein said sides of the package base are mechanically separated from one another between the sensor mounting portions of the base;

further comprising a connected end that joins the temperature side and the strain side at one end of the package base;

further comprising mounting portions at both ends of the strain side, for attaching the strain measurement apparatus to the object;

wherein said package base isolates said first sensor device from being influenced by strain and exposes said at least one second sensor device to be influenced by strain.

11. The package base according to claim 10, further comprising thinned sensor mounting portions on at least the underside of the base to provide a recess to prevent deflection of the object from causing the object to contact said temperature side.

12. The package base according to claim 10, wherein the mounting portion of the strain side further comprises at least one laterally narrowed sensor mounting portion, thereby producing an enhanced strain sensitivity.

13. The package base according to claim 10, further comprising walls around said temperature side to mechanically stiffen said side.

14. The package base according to claim 10, further comprising a thinned region between said connected end of said package base and said temperature side to provide a preferential location for bending of said temperature side should the object contact said temperature side when under deflection.

15. The package base according to claim 10, further comprising a continuous base portion that extends from the connected end around the entire perimeter of said base, wherein said continuous base portion is disconnected from said temperature side at the end of the temperature side most distant from said connected end in an operational sensor apparatus.

* * * * *